US012659517B2

(12) United States Patent
Ouedraogo et al.

(10) Patent No.: US 12,659,517 B2
(45) **Date of Patent: *Jun. 16, 2026**

(54) VIDEO CODING AND DECODING

(71) Applicant: CANON KABUSHIKI KAISHA, Tokyo (JP)

(72) Inventors: Naël Ouedraogo, Val d'Anast (FR); Patrice Onno, Rennes (FR); Guillaume Laroche, Saint Aubin d'Aubigné (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/932,363

(22) Filed: Oct. 30, 2024

(65) Prior Publication Data

US 2025/0056059 A1      Feb. 13, 2025

Related U.S. Application Data

(63) Continuation of application No. 17/914,096, filed as application No. PCT/EP2021/057302 on Mar. 22, 2021, now Pat. No. 12,167,040.

(30) Foreign Application Priority Data

Mar. 27, 2020    (GB) ..................................... 2004540
Apr. 3, 2020    (GB) ..................................... 2004958

(51) Int. Cl.
*H04N 19/70*        (2014.01)
*H04N 19/169*        (2014.01)
(Continued)

(52) U.S. Cl.
CPC ........... *H04N 19/70* (2014.11); *H04N 19/172* (2014.11); *H04N 19/188* (2014.11); *H04N 19/426* (2014.11)

(58) Field of Classification Search
CPC .... H04N 19/70; H04N 19/172; H04N 19/188; H04N 19/426
(Continued)

(56) References Cited

U.S. PATENT DOCUMENTS

2020/0186798 A1* 6/2020 Shlyakhov ........... H04N 19/463
2022/0303582 A1* 9/2022 Sánchez De La Fuente ...............
H04N 19/463

FOREIGN PATENT DOCUMENTS

CN    106105040 A    11/2016
CN    115428463 A    12/2022
EP    4475529 A1    12/2024

* cited by examiner

*Primary Examiner* — Allen C Wong
(74) *Attorney, Agent, or Firm* — Canon U.S.A., Inc. IP Division

(57)    ABSTRACT

A sequence of images is encoded in a bitstream as a series of picture units PU-01~03. Each picture unit corresponds to one encoded image and includes one or more network abstraction layer (NAL) units NAL-01~23. The NAL units may be video coding layer (VCL) NAL units which each contain encoded image data or adaptation parameter set NAL units which each contain an adaptation parameter set (APS) having parameters for performing one or more types of processing operation on the image data contained in one or more VCL NAL units. The APS NAL units may be prefix APS NAL units P-APS or suffix APS NAL units S-APS. An additional constraint is applied to the bitstream prohibiting inclusion of a prefix APS NAL unit after the first NAL unit of the picture unit concerned. This can avoid more than one APS applying to slices belonging to the same picture unit.

16 Claims, 15 Drawing Sheets

(51) Int. Cl.
*H04N 19/172* (2014.01)
*H04N 19/426* (2014.01)
(58) Field of Classification Search
USPC .................................................. 375/240.02
See application file for complete search history.

VIDEO CODING AND DECODING

CROSS REFERENCE TO RELATED APPLICATION

This application is a continuation of U.S. application Ser. No. 17/914,096, filed on Sep. 23, 2022, which is the National Phase application of PCT Application No. PCT/EP2021/057302, filed on Mar. 22, 2021. This application claims the benefit under 35 U.S.C. § 119(a)-(d) of United Kingdom Patent Application No. 2004540.7, filed on Mar. 27, 2020 and United Kingdom Patent Application No. 2004958.1, filed on Apr. 3, 2020. The above cited patent applications are incorporated herein by reference in their entirety.

FIELD OF INVENTION

The present invention relates to video coding and decoding, and in particular to video coding and decoding using adaptive parameter sets (APSs).

BACKGROUND

Recently, the Joint Video Experts Team (JVET), a collaborative team formed by MPEG and ITU-T Study Group 16's VCEG, commenced work on a new video coding standard referred to as Versatile Video Coding (VVC). The goal of VVC is to provide significant improvements in compression performance over the existing HEVC standard (i.e., typically twice as much as before) and to be completed in 2020. The main target applications and services include—but not limited to—360-degree and high-dynamic-range (HDR) videos. In total, JVET evaluated responses from 32 organizations using formal subjective tests conducted by independent test labs. Some proposals demonstrated compression efficiency gains of typically 40% or more when compared to using HEVC. Particular effectiveness was shown on ultra-high definition (UHD) video test material. Thus, we may expect compression efficiency gains well-beyond the targeted 50% for the final standard.

VVC provides an adaptive parameter set or APS to convey parameters that may be shared by one or more slices of a coded video sequence. VVC Draft 8 defines an APS as a syntax structure containing syntax elements that apply to zero or more slices as determined by zero or more syntax elements found in slice or picture headers. More than one APS may apply to slices belonging to the same coded picture. A Picture Unit corresponds to exactly one coded picture. The Picture Unit is in turn a set of network abstraction layer (NAL) units. In VVC Draft 8, any APSs present within a Picture Unit are constrained to share same content when having the same APS type and the same APS identifier. Also, when a Picture Unit is coded using several slices that may refer to an APS sent prior to the slice NAL unit, some configurations may require additional decoding operations to maintain in memory the APS in use and/or bitstream rewriting operations when performing random access decoding at a specific timing in the coded video sequence.

It is desirable to improve the coding of the APSs and their referencing.

SUMMARY

According to a first aspect of the present invention there is provided a method of encoding a sequence of images in a bitstream, comprising: providing a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; and prohibiting inclusion, in a picture unit, of a prefix APS NAL unit after the first NAL unit of the picture unit concerned.

This can solve the problem that in VVC8, two versions of an APS may apply to different slices of the same picture unit. Then, to decode the bitstream the decoder has to store in memory two versions of an APS for a given pair of values of APS identifier and APS type. In worst-case example, the decoder may have to double the memory size (to maintain two versions of each APS) to store the APSs needed to decode a Picture Unit. In addition, the decoder has to maintain the order of the VCL NAL units relative to the APS NAL units in order to determine which VCL NAL units refer to the first or to the second version of the APS NAL unit. By prohibiting inclusion, in a picture unit, of a prefix APS NAL unit after the first NAL unit of the picture unit concerned, some situations where two versions of an APS are required can be eliminated.

According to a second aspect of the present invention there is provided a method of encoding a sequence of images which is the same as that of the first aspect except that instead of prohibiting inclusion, in a picture unit, of a prefix APS NAL unit after the first NAL unit of the picture unit concerned as in the first aspect, the second aspect involves prohibiting inclusion, in a picture unit, of a suffix APS NAL unit before the last NAL unit of the picture unit concerned.

This method is complementary to the method of the first aspect and addresses the same problem. By prohibiting inclusion, in a picture unit, of a suffix APS NAL unit before the last NAL unit of the picture unit concerned, some situations where two versions of an APS are required can be eliminated.

It is also possible to do both prohibiting inclusion, in a picture unit, of a suffix APS NAL unit before the last NAL unit of the picture unit concerned, and prohibiting inclusion, in a picture unit, of a prefix APS NAL unit after the first NAL unit of the picture unit concerned. Elimination of situations where two versions of an APS are required is then further enhanced.

According to a third aspect of the present invention there is provided a method of encoding a sequence of images in a bitstream, comprising: providing a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; and permitting inclusion, in the same picture unit, of a prefix APS NAL unit and a suffix APS NAL unit having the same APS type and the same APS identifier but different contents.

Permitting inclusion, in the same picture unit, of a prefix APS NAL unit and a suffix APS NAL unit having the same APS type and the same APS identifier but different contents amounts to a new freedom over the constraints in VVC8. In VVC8 even if the APS NAL units are of different (prefix and suffix) types they cannot be present in one picture unit.

When an application performs random access into the bitstream to start the decoding at a certain picture unit (a random access point), the application may have to provide certain APS NAL units prior to the VCL NAL units of the picture unit. For example, the application may insert the necessary APS NAL units at the beginning of the picture unit. But the resulting bitstream is likely to break certain constraints of VVC8. This is turn may result in the decoding entering an error state.

One constraint is that a suffix APS NAL unit may be inserted before the first VCL NAL unit of the PU, contrary to the constraint that the encoder must use a prefix APS NAL unit when the APS is sent before the first VCL NAL of the PU. Also the insertion(s) may result in the picture unit having suffix and prefix APS NAL units which contain APSs with the same identifier and type but with different contents which is not allowed in VVC8.

The application may thus have to rewrite the APS type (nal_unit_type) of an APS NAL unit to generate a new prefix APS NAL unit. In addition, the application may have to move and rewrite the suffix APS NAL unit as a new prefix APS NAL unit at the beginning of the next PU. If this next PU also happens to contain an APS NAL unit with same identifier and type as the new prefix APS NAL unit, the application may also have to move and rewrite that.

These moving operations to make the bitstream conform to VVC8 are costly since in the worst case they may require rewriting all the APS NAL units of the PU after the random accessed picture unit.

The methods of the third aspect of the present invention impose, remove or modify constraints on the syntax structure to ensure that there are fewer, or even no, rewriting operations.

One embodiment further comprises: prohibiting use of a suffix APS NAL unit associated with a particular VCL NAL unit by the VCL NAL units of the picture unit containing the suffix APS NAL unit; and allowing use of that suffix APS NAL unit by VCL NAL units of picture units following that suffix APS NAL unit in decoding order.

Another embodiment further comprises constraining the APS NAL units includable in a picture unit so that: a prefix APS NAL unit must be before any suffix APS NAL unit in the picture unit concerned and before the last VCL NAL unit of the picture unit concerned; and a suffix APS NAL unit must be after any prefix APS NAL unit in the picture unit concerned and after the first VCL NAL unit of the picture unit concerned.

Another embodiment further comprises prohibiting inclusion, in a picture unit, of a suffix APS NAL unit before the last NAL unit of the picture unit concerned.

Another embodiment further comprises prohibiting inclusion, in a picture unit, of a prefix APS NAL unit after the first NAL unit of the picture unit concerned.

Another embodiment further comprises prohibiting, in a picture unit, a VCL NAL unit that refers to an APS having a particular APS type and a particular APS identifier from being followed by a prefix APS NAL unit containing an APS having the same APS type and the same APS identifier. This measure can be applied to the second aspect of the present invention, too, without (as in the third aspect) permitting inclusion, in the same picture unit, of a prefix APS NAL unit and a suffix APS NAL unit having the same APS type and the same APS identifier but different contents.

Another embodiment further comprises prohibiting, in a picture unit, a VCL NAL unit that refers to an APS having a particular APS type and a particular APS identifier from being preceded by a suffix APS NAL unit containing an APS having the same APS type and the same APS identifier. This measure can be applied to the first aspect of the present invention, too, without (as in the third aspect) permitting inclusion, in the same picture unit, of a prefix APS NAL unit and a suffix APS NAL unit having the same APS type and the same APS identifier but different contents.

Also, the last two measures can be used without (as in the first aspect) prohibiting inclusion, in a picture unit, of a prefix APS NAL unit after the first NAL unit of the picture unit concerned, and without (as in the second aspect) prohibiting inclusion, in a picture unit, of a suffix APS NAL unit before the last NAL unit of the picture unit concerned, and without (as in the third aspect) permitting inclusion, in the same picture unit, of a prefix APS NAL unit and a suffix APS NAL unit having the same APS type and the same APS identifier but different contents. Thus, according to another aspect of the present invention there is provided a method of encoding a sequence of images in a bitstream, comprising: providing a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; doing one or both of: prohibiting, in a picture unit, a VCL NAL unit that refers to an APS having a particular APS type and a particular APS identifier from being followed by a prefix APS NAL unit containing an APS having the same APS type and the same APS identifier; and prohibiting, in a picture unit, a VCL NAL unit that refers to an APS having a particular APS type and a particular APS identifier from being preceded by a suffix APS NAL unit containing an APS having the same APS type and the same APS identifier.

According to a fourth aspect of the present invention there is provided a method of decoding a sequence of encoded images, comprising: receiving a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; and checking conformance of the received bitstream with one or more conformity criteria, wherein the or one said conformity criterion is a constraint prohibiting inclusion, in a picture unit, of a prefix APS NAL unit after the first NAL unit of the picture unit concerned.

According to a fifth aspect of the present invention there is provided a method of decoding a sequence of encoded images in which, instead of checking conformance of the received bitstream with a constraint prohibiting inclusion, in a picture unit, of a prefix APS NAL unit after the first NAL unit of the picture unit concerned (as in the fourth aspect) conformance of the received bitstream is checked with a constraint prohibiting inclusion, in a picture unit, of a suffix APS NAL unit before the last NAL unit of the picture unit concerned.

In one embodiment the checking involves checking conformity with both the constraint prohibiting inclusion, in a picture unit, of a suffix APS NAL unit before the last NAL unit of the picture unit concerned and the constraint prohibiting inclusion, in a picture unit, of a prefix APS NAL unit after the first NAL unit of the picture unit concerned.

According to a sixth aspect of the present invention there is provided a method of decoding a sequence of encoded images, comprising: receiving a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; and checking conformance of the received bitstream with one or more conformity criteria, the or one said conformity criterion permitting inclusion, in the same picture unit, of a prefix APS NAL unit and a suffix APS NAL unit having the same APS type and the same APS identifier but different contents.

In one embodiment the conformity criteria comprise: prohibiting use of a suffix APS NAL unit associated with a particular VCL NAL unit by the VCL NAL units of the picture unit containing the particular VCL NAL unit; and allowing use of that suffix APS NAL unit by VCL NAL units of picture units following that suffix APS NAL unit in decoding order.

In another embodiment the conformity criteria comprise constraining the APS NAL units includable in a picture unit so that: a prefix APS NAL unit must be before any suffix APS NAL unit in the picture unit concerned and before the last VCL NAL unit of the picture unit concerned; and a suffix APS NAL unit must be after any prefix APS NAL unit in the picture unit concerned and after the first VCL NAL unit of the picture unit concerned.

In another embodiment the conformity criteria comprise a constraint prohibiting inclusion, in a picture unit, of a suffix APS NAL unit before the last NAL unit of the picture unit concerned.

In another embodiment the conformity criteria comprise prohibiting inclusion, in a picture unit, of a prefix APS NAL unit after the first NAL unit of the picture unit concerned.

In another embodiment the conformity criteria comprise prohibiting, in a picture unit, a VCL NAL unit that refers to an APS having a particular APS type and a particular APS identifier from being followed by a prefix APS NAL unit containing an APS having the same APS type and the same APS identifier. This measure can be applied to the fifth aspect of the present invention, too, without (as in the sixth aspect) permitting inclusion, in the same picture unit, of a prefix APS NAL unit and a suffix APS NAL unit having the same APS type and the same APS identifier but different contents.

In another embodiment the conformity criteria comprise prohibiting, in a picture unit, a VCL NAL unit that refers to an APS having a particular APS type and a particular APS identifier from being preceded by a suffix APS NAL unit containing an APS having the same APS type and the same APS identifier. This measure can be applied to the fourth aspect of the present invention, too, without (as in the sixth aspect) permitting inclusion, in the same picture unit, of a prefix APS NAL unit and a suffix APS NAL unit having the same APS type and the same APS identifier but different contents.

Also, the last two measures can be used without (as in the fourth aspect) prohibiting inclusion, in a picture unit, of a prefix APS NAL unit after the first NAL unit of the picture unit concerned, and without (as in the fifth aspect) prohibiting inclusion, in a picture unit, of a suffix APS NAL unit before the last NAL unit of the picture unit concerned, and without (as in the sixth aspect) permitting inclusion, in the same picture unit, of a prefix APS NAL unit and a suffix APS NAL unit having the same APS type and the same APS identifier but different contents. Thus, according to another aspect of the present invention there is provided a method of decoding a sequence of encoded images, comprising: receiving a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; and checking conformance of the received bitstream with one or more conformity criteria, wherein the conformity criteria include one or both of: a criterion prohibiting, in a picture unit, a VCL NAL unit that refers to an APS having a particular APS type and a particular APS identifier from being followed by a prefix APS NAL unit containing an APS having the same APS type and the same APS identifier; and a criterion prohibiting, in a picture unit, a VCL NAL unit that refers to an APS having a particular APS type and a particular APS identifier from being preceded by a suffix APS NAL unit containing an APS having the same APS type and the same APS identifier.

In methods embodying the aforesaid first to sixth aspects and the further aspects of the present invention the NAL units are not limited to VCL NAL units and APS NAL units. For example, the NAL units includable in the series of picture units may further comprise a picture header NAL unit which is neither a VCL NAL unit nor an APS NAL unit and which if present in a picture unit precedes the first VCL NAL unit of the picture unit concerned. In that case, the APS NAL units referred to in this PH must be prior not only to the first VCL NAL unit but also prior to the PH NAL unit. Instead of a PH NAL unit a more generic formulation is a non-VCL NAL unit which is neither a VCL NAL nor an APS NAL unit that signals references to APSs for one or more VCL NAL units. The constraints for the ordering of the APS NAL units should be now relative to these non-VCL NAL units. For example, the prefix APS NAL unit should be prior to the first non-VCL NAL unit and to the first VCL NAL unit.

According to a seventh aspect of the present invention there is provided a device for encoding a sequence of images in a bitstream, comprising: means for providing a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; and means for prohibiting inclusion, in a picture unit, of a prefix APS NAL unit after the first NAL unit of the picture unit concerned.

According to an eighth aspect of the present invention there is provided a device for encoding a sequence of images in a bitstream, comprising: means for providing a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; and means for prohibiting inclusion, in a picture unit, of a suffix APS NAL unit before the last NAL unit of the picture unit concerned.

According to a ninth aspect of the present invention there is provided a device for encoding a sequence of images in a bitstream, comprising: means for providing a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; and means for permitting inclusion, in the same picture unit, of a prefix APS NAL unit and a suffix APS NAL unit having the same APS type and the same APS identifier but different contents.

According to a tenth aspect of the present invention there is provided a device for decoding a sequence of encoded images, comprising: means for receiving a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; and means for checking conformance of the received bitstream with one or more conformity criteria, wherein the or one said conformity criterion is a constraint prohibiting inclusion, in a picture unit, of a prefix APS NAL unit after the first NAL unit of the picture unit concerned.

According to an eleventh aspect of the present invention there is provided a device for decoding a sequence of encoded images, comprising: means for receiving a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; and means for checking conformance of the received bitstream with one or more conformity criteria, wherein the or one said conformity criterion is a constraint prohibiting inclusion, in a picture unit, of a suffix APS NAL unit before the last NAL unit of the picture unit concerned.

According to a twelfth aspect of the present invention there is provided a device for decoding a sequence of encoded images, comprising: means for receiving a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; and means for checking conformance of the received bitstream with one or more conformity criteria, the or one said conformity criterion permitting inclusion, in the same picture unit, of a prefix APS NAL unit and a suffix APS NAL unit having the same APS type and the same APS identifier but different contents.

In the methods of the fourth to sixth aspects and the further aspects and the devices of the tenth to twelfth aspects, in the event that the conformance checking reveals a non-conformant bitstream decoding of the bitstream may be abandoned in whole or in part. Also, actions such as notifying errors to a user of the decoder may be taken. The decoder may also signal to the encoder that the bitstream is non-compliant and is unsuitable for decoding. The encoder may respond by re-encoding the sequence of images to produce a conformant bitstream. As noted later, conformance checking is not mandatory in all decoding methods or in all decoders embodying this invention.

According to a thirteenth aspect of the present invention there is provided a program which when executed by a processor or a computer causes the processor or computer to carry out the method of any one of the first to sixth aspects of the present invention.

The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet. Further features of the invention are characterised by the independent and dependent claims According to a fourteenth aspect of the present invention there is provided a bitstream representing a sequence of encoded images and having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; wherein none of the picture units of the series of picture units includes a prefix APS NAL unit after the first NAL unit of the picture unit concerned.

An alternative way of expressing the preceding bitstream characteristic is that inclusion, in a picture unit, of a prefix APS NAL unit after the first NAL unit of the picture unit concerned is prohibited.

According to a fifteenth aspect of the present invention there is provided a bitstream representing a sequence of encoded images and having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit; wherein none of the picture units of the series of picture units includes a suffix APS NAL unit before the last NAL unit of the picture unit concerned.

An alternative way of expressing the preceding bitstream characteristic is that inclusion, in a picture unit, of a suffix APS NAL unit before the last NAL unit of the picture unit concerned is prohibited.

Preferably, none of the picture units of the series of picture units includes a suffix APS NAL unit before the last NAL unit of the picture unit concerned and none of the picture units of the series of picture units includes a prefix APS NAL unit after the first NAL unit of the picture unit concerned.

An alternative way of expressing the preceding bitstream characteristics is that inclusion, in a picture unit, of a suffix APS NAL unit before the last NAL unit of the picture unit concerned is prohibited, and inclusion, in a picture unit, of a prefix APS NAL unit after the first NAL unit of the picture unit concerned is prohibited.

According to a sixteenth aspect of the present invention there is provided a bitstream representing a sequence of encoded images and having a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; wherein at least one picture unit of the series of picture units includes a prefix APS NAL unit and a suffix APS NAL unit having the same APS type and the same APS identifier but different contents.

An alternative way of expressing the preceding bitstream characteristic is that inclusion, in the same picture unit, of a prefix APS NAL unit and a suffix APS NAL unit having the same APS type and the same APS identifier but different contents is permitted.

In one embodiment: in each of the picture units of the series where there is a suffix APS NAL unit, that suffix unit is not used by the VCL NAL units of the picture unit containing the particular VCL NAL unit; and for at least one picture unit with such a suffix APS NAL unit not used by the VCL NAL units of the picture unit containing the particular VCL NAL unit, that suffix APS NAL unit is used by one or more VCL NAL units of one or more picture units following that suffix APS NAL unit in decoding order.

An alternative way of expressing the preceding bitstream characteristics is that: use of a suffix APS NAL unit by the VCL NAL units of the picture unit containing the particular VCL NAL unit is prohibited; and use of that suffix APS NAL unit by VCL NAL units of picture units following that suffix APS NAL unit in decoding order is allowed.

In one embodiment: in each picture unit including a prefix APS NAL unit, the prefix APS NAL unit is before any suffix APS NAL unit in the picture unit concerned and before the last VCL NAL unit of the picture unit concerned; and in each picture unit including a suffix APS NAL unit, the suffix APS NAL unit must be after any prefix APS NAL unit in the picture unit concerned and after the first VCL NAL unit of the picture unit concerned.

An alternative way of expressing the preceding bitstream characteristics is that the APS NAL units included in the series of picture units are constrained so that: a prefix APS NAL unit is before any suffix APS NAL unit in the picture unit concerned and before the last VCL NAL unit of the picture unit concerned; and a suffix APS NAL unit is after any prefix APS NAL unit in the picture unit concerned and after the first VCL NAL unit of the picture unit concerned.

In one embodiment, none of the picture units of the series includes a suffix APS NAL unit before the last NAL unit of the picture unit concerned.

An alternative way of expressing the preceding bitstream characteristic is that inclusion, in a picture unit, of a suffix APS NAL unit after the last NAL unit of the picture unit concerned is prohibited.

In one embodiment, none of the picture units of the series includes a prefix APS NAL unit after the first NAL unit of the picture unit concerned.

An alternative way of expressing the preceding bitstream characteristic is that inclusion, in a picture unit, of a prefix APS NAL unit after the first NAL unit of the picture unit concerned is prohibited.

In one embodiment, in any picture unit including a VCL NAL unit that refers to an APS having a particular APS type and a particular APS identifier the referring VCL NAL unit is not followed by a prefix APS NAL unit containing an APS having the same APS type and the same APS identifier. This measure can be applied to the fifteenth aspect of the present invention, too, without (as in the sixteenth aspect) permitting inclusion, in the same picture unit, of a prefix APS NAL unit and a suffix APS NAL unit having the same APS type and the same APS identifier but different contents.

An alternative way of expressing the preceding bitstream characteristic is that, in a picture unit, a VCL NAL unit that refers to an APS having a particular APS type and a particular APS identifier is prohibited from being followed by a prefix APS NAL unit containing an APS having the same APS type and the same APS identifier.

In one embodiment, in any picture unit including a VCL NAL unit that refers to an APS having a particular APS type and a particular APS identifier the referring VCL NAL unit is not preceded by a suffix APS NAL unit containing an APS having the same APS type and the same APS identifier. This measure can be applied to the fourteenth aspect of the present invention, too, without (as in the sixteenth aspect) permitting inclusion, in the same picture unit, of a prefix APS NAL unit and a suffix APS NAL unit having the same APS type and the same APS identifier but different contents.

An alternative way of expressing the preceding bitstream characteristic is that, in a picture unit, a VCL NAL unit that refers to an APS having a particular APS type and a particular APS identifier is prohibited from being preceded by a suffix APS NAL unit containing an APS having the same APS type and the same APS identifier.

Also, the last two measures can be used without the bitstream characteristic (of the fourteenth aspect) that none of the picture units of the series of picture units includes a prefix APS NAL unit after the first NAL unit of the picture unit concerned, and without the bitstream characteristic (of the fifteenth aspect) that none of the picture units of the series of picture units includes a suffix APS NAL unit before the last NAL unit of the picture unit concerned, and without the bitstream characteristic (of the sixteenth aspect) at least one picture unit of the series of picture units includes a prefix APS NAL unit and a suffix APS NAL unit having the same APS type and the same APS identifier but different contents. Thus, according to another aspect of the present invention there is provided a bitstream representing a sequence of encoded images and having a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if an APS is present in a picture unit before a first VCL NAL of the picture unit concerned the APS must be contained in a prefix APS NAL unit and if an APS is present in a picture unit after a last VCL NAL of the picture unit concerned the APS must be contained in a suffix APS NAL unit, each said APS NAL unit having an APS type and an APS identifier; the bitstream having one or both of the following characteristics: in any picture unit including a VCL NAL unit that refers to an APS having a particular APS type and a particular APS identifier the referring VCL NAL unit is not followed by a prefix APS NAL unit containing an APS having the same APS type and the same APS identifier; and in any picture unit including a VCL NAL unit that refers to an APS having a particular APS type and a particular APS identifier the referring VCL NAL unit is not preceded by a suffix APS NAL unit containing an APS having the same APS type and the same APS identifier.

How the bitstreams of the fourteenth to sixteenth aspects and the further aspect above are used is not particularly limited. A seventeenth aspect of the present invention provides a method of encoding a sequence of images in a bitstream according to any one of the fourteenth to sixteenth aspects and the further aspect.

An eighteenth aspect of the present invention provides a method of decoding a sequence of encoded images, the method comprising receiving a bitstream according to any one of the fourteenth to sixteenth aspects.

In this aspect it is enough to receive the bitstream. Conformance checking is not required. For example, the decoder may simply receive the bitstream of any one the fourteenth to sixteenth aspects and decode it. For example, one embodiment further comprises decoding the NAL units, obtaining the image data contained in the VCL NAL units and the parameters of the APSs contained in the APS NAL units, and processing the obtained image data using the obtained APS parameters.

According to a nineteenth aspect of the present invention there is provided a bitstream produced by the method of encoding of any one of the first to third aspects of the present invention.

The bitstream is normally in the form of a transitory signal. However, in non-transitory form the bitstream may be stored, for example in a computer-readable storage or recording medium such as a media storage device. A DVD, Blu-ray disk or other optical storage medium is an example of a storage medium for a bitstream. Thus, according to a twentieth aspect of the present invention there is provided a computer-readable storage medium storing the bitstream of any one of the fourteenth to sixteenth and nineteenth aspects of the present invention.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

BRIEF DESCRIPTION OF THE DRAWINGS

Embodiments of the invention will now be described, by way of example only, and with reference to the following drawings in which.

DETAILED DESCRIPTION

Figure 1:
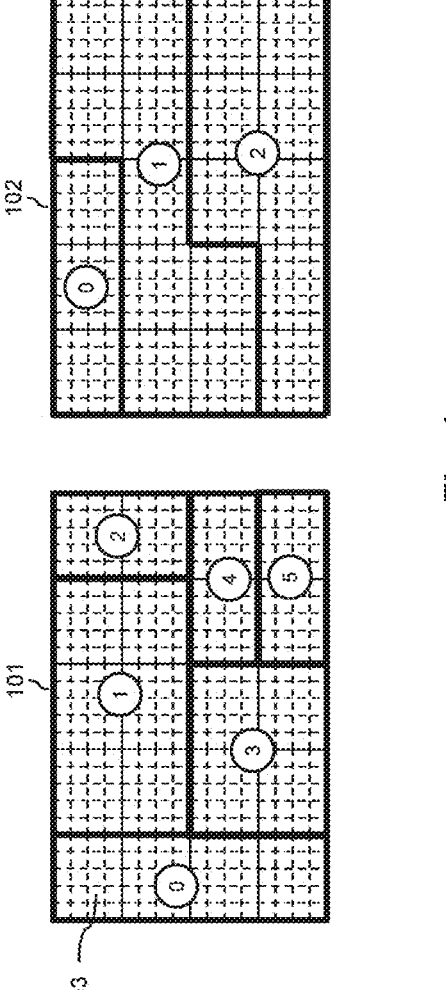
FIG. 1 illustrates partitioning of a Picture into tiles and slices according to an embodiments of the invention.

Embodiments of the present invention described below relate to improving encoding and decoding of images (or pictures).

In this specification "signalling" may refer to inserting into (providing/including/encoding in), or extracting/obtaining (decoding) from, a bitstream information about one or more parameters or syntax elements, for example information for determining any one or more of an identifier of a subpicture, a size/width/height of a subpicture, whether only a single image portion (e.g. a slice) is included in a subpicture, whether a slice is a rectangular slice, and/or a number of slices included in a subpicture.

In this specification "processing" may refer to any kind of operation being performed on data, e.g. encoding or decoding image data for one or more image(s)/picture(s).

In this specification, the term "slice" is used as example of an image portion (other examples of such an image portion would be an image part which comprises one or more Coding Tree Unit(s)). It is understood that embodiments of the invention may also be implemented based on an image portion, instead of a slice, and an appropriately modified parameter/value/syntax such as a header for the image portion (instead of a slice header or a slice segment header). It is also understood that various information described herein as being signalled in a slice header, a slice segment header, a sequence parameter set (SPS), or a Picture Parameter Set (PPS) may be signalled elsewhere as long as they are capable of providing the same functionality provided by signalling them in those media. It is also understood that any of a slice, a tile group, a tile, a Coding Tree Unit (CTU)/Largest Coding Unit (LCU), a Coding Tree Block (CTB), a Coding Unit (CU), a Prediction Unit (PU), a Transform Unit (TU), or a block of pixels/samples may be referred to as an image portion.

It is also understood that: when a component or a tool is described as "active", the component/tool is "enabled" or "available for use" or "used"; when described as "inactive", the component/tool is "disabled" or "unavailable for use" or "not used"; and "can be inferred" refers to being able to determine/obtain a relevant value or a parameter from other information without explicitly signalling it in the bitstream. Further, it is also understood that when a flag is described as "active" it means the flag indicates the relevant component/tool is "active" (i.e "effective").

In this specification, unless stated otherwise the terms concerned have the same definitions as those in the latest VVC Draft 8, VVC8, set out below. Terms in italics have their own VVC8 definition.

A slice: An integer number of complete tiles or an integer number of consecutive complete CTU rows within a tile of a picture that are exclusively contained in a single NAL unit.

A slice header: A part of a coded slice containing the data elements pertaining to all tiles or CTU rows within a tile represented in the slice.

A tile: A rectangular region of CTUs within a particular tile column and a particular tile row in a picture.

A subpicture: A rectangular region of one or more slices within a picture

A picture (or an image): An array of luma samples in monochrome format or an array of luma samples and two corresponding arrays of chroma samples in 4:2:0, 4:2:2, and 4:4:4 colour format.

A coded picture: A coded representation of a picture comprising VCL NAL units with a particular value of nuh_layer_id within an AU and containing all CTUs of the picture.

A coded representation: A data element as represented in its coded form.

A raster scan: A mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.

A block: An M×N (M-column by N-row) array of samples, or an M×N array of transform coefficients.

A coding block: An M×N block of samples for some values of M and N such that the division of a CTB into coding blocks is a partitioning.

A coding tree block (CTB): An N×N block of samples for some value of N such that the division of a component into CTBs is a partitioning.

A coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.

A coding unit (CU): A coding block of luma samples, two corresponding coding blocks of chroma samples of a picture that has three sample arrays, or a coding block of samples of a monochrome picture or a picture that is coded using three separate colour planes and syntax structures used to code the samples.

A component: An array or single sample from one of the three arrays (luma and two chroma) that compose a picture in 4:2:0, 4:2:2, or 4:4:4 colour format or the array or a single sample of the array that compose a picture in monochrome format.

A picture parameter set (PPS): A syntax structure containing syntax elements that apply to zero or more entire coded pictures as determined by a syntax element found in a picture header or slice header.

A sequence parameter set (SPS): A syntax structure containing syntax elements that apply to zero or more entire CLVs as determined by the content of a syntax element found in the PPS referred to by a syntax element found in a picture header.

An adaptation parameter set (APS): A syntax structure containing syntax elements that apply to zero or more slices as determined by zero or more syntax elements found in slice or picture headers.

A network abstraction layer (NAL) unit: A syntax structure containing an indication of the type of data to follow and bytes containing that data in the form of an RBSP interspersed as necessary with emulation prevention bytes.

A video coding layer (VCL) NAL unit: A collective term for coded slice NAL units and the subset of NAL units that have reserved values of nal_unit_type that are classified as VCL NAL units in this Specification.

A picture header (PH): A syntax structure containing syntax elements that apply to all slices of a coded picture.

A slice header: A part of a coded slice containing the data elements pertaining to all tiles or CTU rows within a tile represented in the slice.

Adaptive loop filter (ALF): A filtering process that is applied as part of the decoding process and is controlled by parameters conveyed in an APS.

Luma mapping with chroma scaling (LMCS): A process that is applied as part of the decoding process that maps luma samples to particular values and may apply a scaling operation to the values of chroma samples.

Scaling list: A list that associates each frequency index with a scale factor for the scaling process.

A Picture Unit (PU): A set of NAL units that are associated with each other according to a specified classification rule, are consecutive in decoding order, and contain exactly one coded picture.

An access unit (AU): A set of PUs that belong to different layers and contain coded pictures associated with the same time for output from the DPB.

FIG. 1 illustrates partitioning of a Picture into tiles and slices according to an embodiment of the invention, which is compatible with VVC8. Pictures 101 and 102 are divided into coding tree units (CTU) represented by the dotted lines. A CTU is an elementary unit of encoding and decoding for VVC8. For example, in VVC8, the CTU can encode an area of 128 by 128 pixels.

A Coding Tree Unit (CTU) may also be referred to as a block (of pixels or component sample (values), a macro block, or even a coding block. It can be used to encode/ decode different image components of the picture simultaneously or it can be limited to only one image component so that the different image components of the picture can be encoded/decoded separately/individually. When data for an image comprise separate data for each component, a CTU is a group of Coding Tree Blocks (CTBs), with one CTB per component.

As illustrated by FIG. 1, the picture can also be partitioned according to a grid of tiles (i.e. into one or more grid(s) of tiles), with the tile boundaries represented by the thin solid lines. The tiles are picture parts (parts/portions of the picture) which are rectangular regions (of pixels/component samples) that can be defined independently of the CTU partitioning. A tile may also correspond to a sequence of CTUs, e.g. in VVC8, so as in the represented example in FIG. 1, the partitioning technique can restrict the boundaries of tiles to coincide with/align with boundaries of CTUs.

The tiles are defined so that a tile boundary breaks spatial dependencies of the encoding/decoding process. In other words, in a given picture, a tile is defined/specified so that it can be encoded/decoded independently of another spatially "neighbouring" tile of the same picture. This means that encoding/decoding of a CTU in a tile is not based on pixel/sample or reference data from another tile in the same picture.

Some encoding/decoding systems, e.g. an embodiment of the invention or those for VVC8, provide a notion of a slice (i.e. also use a partitioning technique based on one or more slice(s)). This mechanism enables partitioning of the picture into one group or into several groups of tiles, a group of tiles being collectively referred to as a slice. Each slice is composed of one tile or several tiles or partial tile(s). Two different kinds of slices are provided as illustrated by pictures 101 and 102. A first kind of slice is restricted to slices forming a rectangular area/region in the picture as represented in thick solid lines in picture 101. Picture 101 has a partitioning of the picture into six different rectangular slices (0)-(5). A second kind of slices is restricted to successive tiles (so that they form a sequence of tiles) in a raster scan order as represented in thick solid lines in picture 102. Picture 102 has a partitioning of the picture into three different slices (0)-(2) composed of successive tiles in a raster scan order.

Often, a rectangular slice is a structure/arrangement/ configuration of choice for dealing with regions of interest (RoIs) in a video.

A slice can be encoded in (or decoded from) the bitstream as one or several Network Abstraction Layer (NAL) units. A NAL unit is a logical unit of data for the encapsulation of data in the encoded/decoded bitstream (e.g. a packet that contains an integer number of bytes, wherein a plurality of packets collectively form a coded video data).

In the encoding/decoding system for VVC8, a slice is normally coded as a single NAL unit. When a slice is coded in the bitstream as several NAL units, each NAL unit for the slice is referred to as a slice segment. A slice segment includes a slice segment header that contains the coding parameters for that slice segment. According to a variant, the header of the first slice segment NAL unit of the slice contains all the coding parameters for the slice. The slice segment header of the subsequent NAL unit(s) of the slice may contain fewer parameters than the first NAL unit. In such a case, the first slice segment is an independent slice segment and the subsequent segments are dependent slice segments (as they rely on coding parameters from the NAL unit of the first slice segment).

Figure 2:
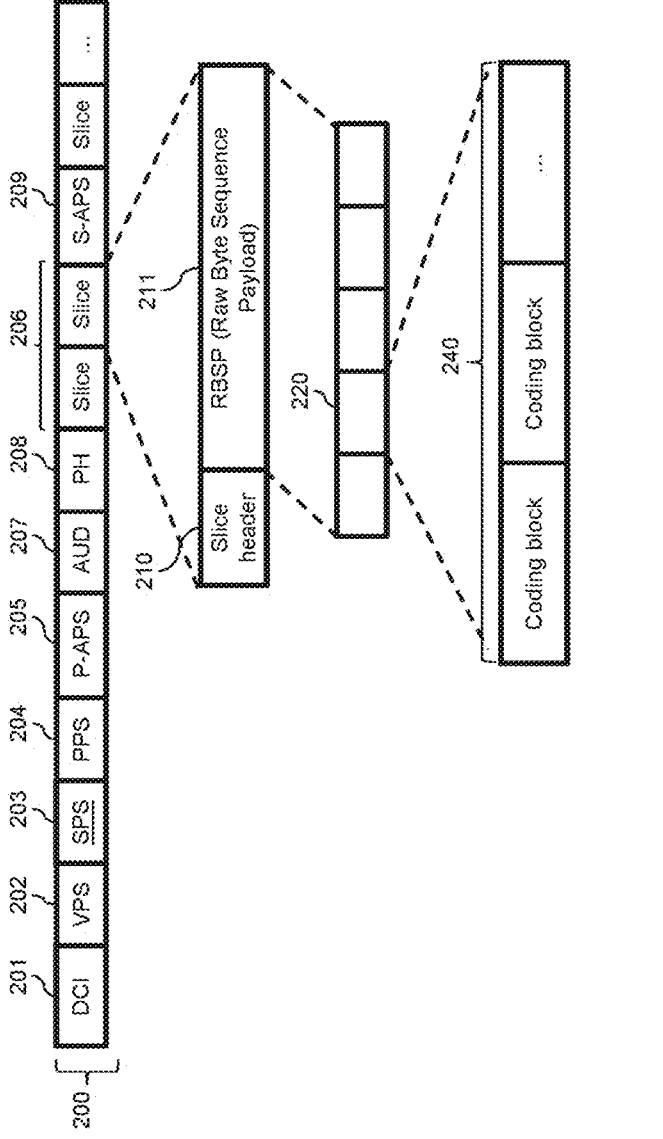
FIG. 2 illustrates an example VVC bitstream.

FIG. 2 illustrates the organisation (i.e. structure, configuration or arrangement) of the bitstream according to an embodiment of the invention which conforms to the requirements of a coding system for VVC8. A bitstream 200 is composed of data representing/indicating an ordered sequence of syntax elements and coded (image) data. The syntax elements and coded (image) data are placed (i.e. packaged/grouped) into a series of NAL units 201-209. There are different NAL unit types. The network abstraction layer (NAL) provides the capability to encapsulate the bitstream into packets for different protocols, like Real Time Protocol/Internet Protocol (RTP/IP), ISO Base Media File Format, etc. The network abstraction layer also provides a framework for packet loss resilience.

NAL units are divided into video coding layer (VCL) NAL units and non-VCL NAL units. The VCL NAL units contain the actual encoded video data. The non-VCL NAL units contain additional information. This additional information may be parameters needed for the decoding of the encoded video data or supplemental data that may enhance usability of the decoded video data. NAL units 206 in FIG. 2 correspond to slices (i.e. they include the actual encoded video data for the slices) and constitute the VCL NAL units of the example bitstream of FIG. 2.

All the NAL units (VCL and associated non-VCL NAL units) that encode a single coded picture form one Picture Unit. In this example, the non-VCL NAL unit 208 is associated with the two VCL NAL units 206 and these three NAL units may together form one Picture Unit.

Different NAL units 201-205 and 209 correspond to different parameter sets, these NAL units being non-VCL NAL units.

DCI stands for Decoding Capability Information. A DCI NAL unit 201 contains parameters that are constant for a given decoding process.

VPS stands for Video Parameter Set. A VPS NAL unit 202 contains parameters defined for the whole video (e.g. the whole video comprises one or more sequences of pictures/ images), and thus are applicable when decoding the encoded video data of the whole bitstream.

The DCI NAL unit may define parameters more static (in the sense that they are stable and do not change as much during the decoding process) than the parameters in the VPS NAL unit. In other words, the parameters of the DCI NAL unit change less frequently than the parameters of the VPS NAL unit.

SPS stands for Sequence Parameter Set. An SPS NAL unit 203 contains parameters defined for a video sequence (i.e. a sequence of pictures or images). In particular, the SPS NAL unit may define the subpictures layout and associated parameters of the video sequence(s). The parameters associated with each subpicture specify the coding constraints applied to the subpicture. According to a variant, the SPS NAL unit comprises a flag indicating that temporal prediction between subpictures is restricted so that only the data coming from the same subpicture are available for use during the temporal prediction process. Another flag may enable or disable the loop filter(s) (i.e. the post filtering) across the subpicture boundaries.

PPS stands for Picture Parameter Set. The PPS NAL unit 204 contains parameters defined for a picture or a group of pictures. The syntax of the PPS as specified in VVC8 comprises a syntax element that specifies the size of the picture in luma samples and also a syntax element for specifying the partitioning of each picture in tiles and slices. The PPS contains syntax elements that make it possible to determine a slice location in a picture/frame.

APS stands for Adaptation Parameter Set. The APS contains parameters for loop filters typically the Adaptive Loop Filter (ALF) or the reshaper model (or luma mapping with chroma scaling (LMCS) model) or the scaling matrices that are used at the slice level.

The APS includes an aps_params_type syntax element that describes the type of parameters present in the APS. For example, aps_params_type equal to ALF_APS indicates that APS contains ALF parameters; aps_params_type equal to LMCS_APS indicates that it contains LMCS parameter and finally, when equal to SCALING_APS it indicates the presence of scaling list parameters.

A second syntax element adaptation_parameter_set_id provides an identifier for the APS.

Two kinds of NAL units may encapsulate an APS: a prefix APS NAL unit 205 and a suffix APS NAL unit 209. According to the VVC8 specification, when prefix APS NAL units are present in a PU, they shall not follow the last VCL NAL unit of the PU. When suffix APS NAL units are present in a PU, they shall not precede the first VCL NAL unit of the PU. In between the first and the last VCL NAL units, prefix and suffix APS NAL units may be present in any order. For example, a first suffix APS NAL may be followed by one prefix NAL unit, then a VCL NAL unit and another suffix APS NAL unit.

SEI stands for Supplemental Enhancement Information. The bitstream may also contain SEI NAL units (not shown in FIG. 3).

The frequency of occurrence (or the frequency of inclusion) of the various parameter sets (or NAL units) in the bitstream is variable. A VPS that is defined for the whole bitstream may occur only once in the bitstream. By contrast, an APS that is defined for a slice may occur once for each slice in each picture. In practice, different slices can rely on (e.g. refer to) the same APS and thus there are generally fewer APS NAL units than slices in the bitstream for a picture.

The AUD NAL unit 207 is an Access Unit Delimiter NAL unit which separates two access units. An access unit is a set of NAL units which may comprise one or more coded pictures with the same decoding timestamp (i.e. a group of NAL units which relate to one or more coded pictures having the same timestamp).

The PH NAL unit 208 is a Picture Header NAL unit which groups parameters common to a set of slices of a single coded picture. The picture may refer to one or more APS to indicate the ALF parameters, reshaper model and the scaling matrices used by the slices of the picture.

Each of the VCL NAL units 206 contains video/image data for a slice. The slice may correspond to the whole picture or subpicture, a single tile or a plurality of tiles or a fraction of a tile (a partial tile). For example, the slice of FIG. 2 contains several tiles 220. A slice is composed of a slice header 210 and a raw byte sequence payload (RBSP) 211 that contains the coded pixels/component sample data encoded as coding blocks 240. When the slice corresponds to the whole picture, the PH NAL unit 208 may be not present and its content is inserted at the beginning of the slice header 210.

The slice header 210 (which is part of a VCL NAL unit 206) and the picture header (which is part of a PH NAL unit 208) may refer to parameters in one or more APSs by signalling the identifier and the type of the or each APS NAL unit containing the referred-to APS. It is a requirement of the VVC8 specification that the NAL unit comprising the APS shall be prior to the PH or VCL NAL unit that refers to the APS.

Figure 3:
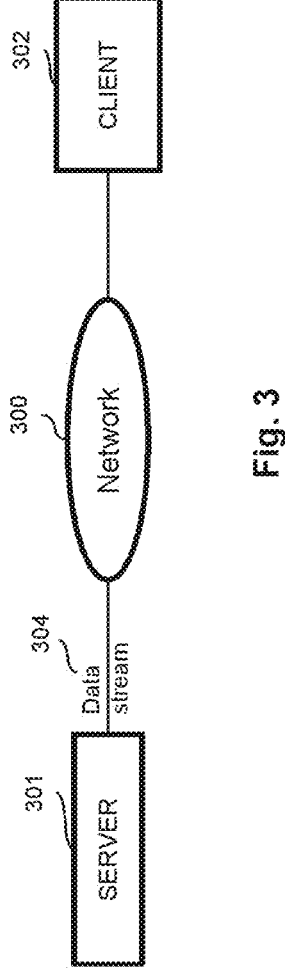
FIG. 3 is a block diagram schematically illustrating a data communication system in which one or more embodiments of the invention may be implemented.

FIG. 3 illustrates a data communication system in which one or more embodiments of the invention may be implemented. The data communication system comprises a transmission device, in this case a server 301, which is operable to transmit data packets of a data stream to a receiving device, in this case a client terminal 302, via a data communication network 300. The data communication network 300 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 301 sends the same data content to multiple clients.

The data stream 304 provided by the server 301 may be composed of multimedia data representing video and audio data. Audio and video data streams may, in some embodiments of the invention, be captured by the server 301 using a microphone and a camera respectively. In some embodiments data streams may be stored on the server 301 or received by the server 301 from another data provider, or generated at the server 301. The server 301 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format or Versatile Video Coding (VVC) format.

The client 302 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

Figure 4:
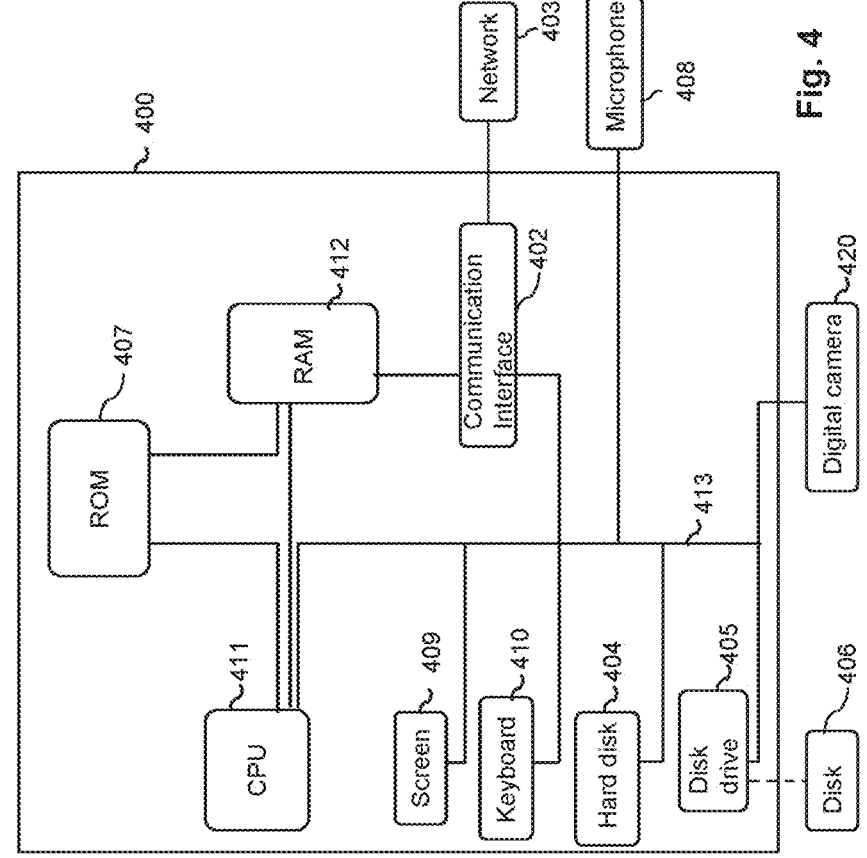
FIG. 4 is a block diagram illustrating components of a processing device in which one or more embodiments of the invention may be implemented.

FIG. 4 schematically illustrates a processing device 400 configured to implement at least one embodiment of the present invention. The processing device 400 may be a device such as a micro-computer, a workstation or a light portable device. The device 400 comprises a communication bus 413 connected to:

a central processing unit 411, such as a microprocessor, denoted CPU;

a read only memory 406, denoted ROM, for storing computer programs for implementing the invention;

a random access memory 412, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 402 connected to a communication network 403 over which digital data to be processed are transmitted or received Optionally, the apparatus 400 may also include the following components:

a data storage means 404 such as a hard disk, for storing computer programs for implementing methods of one or more embodiments of the invention and data used or produced during the implementation of one or more embodiments of the invention;

a disk drive 405 for a disk 406, the disk drive being adapted to read data from the disk 406 or to write data onto said disk;

a screen 409 for displaying data and/or serving as a graphical interface with the user, by means of a keyboard 410 or any other pointing means.

The apparatus 400 can be connected to various peripherals, such as for example a digital camera 420 or a microphone 408, each being connected to an input/output card (not shown) so as to supply multimedia data to the apparatus 400.

The communication bus provides communication and interoperability between the various elements included in the apparatus 400 or connected to it. The representation of the bus is not limiting and in particular the central processing unit is operable to communicate instructions to any element of the apparatus 400 directly or by means of another element of the apparatus 400.

The disk 406 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 406, on the hard disk 404 or on a removable digital medium such as for example a disk 406 as described previously. According to a variant, the executable code of the programs can be received by means of the communication network 403, via the interface 402, in order to be stored in one of the storage means of the apparatus 400 before being executed, such as the hard disk 404.

The central processing unit 411 is adapted to control and direct the execution of the instructions or portions of software code of the program or programs according to the invention, instructions that are stored in one of the aforementioned storage means. On powering up, the program or programs that are stored in a non-volatile memory, for example on the hard disk 404 or in the read only memory 406, are transferred into the random access memory 412, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 5:
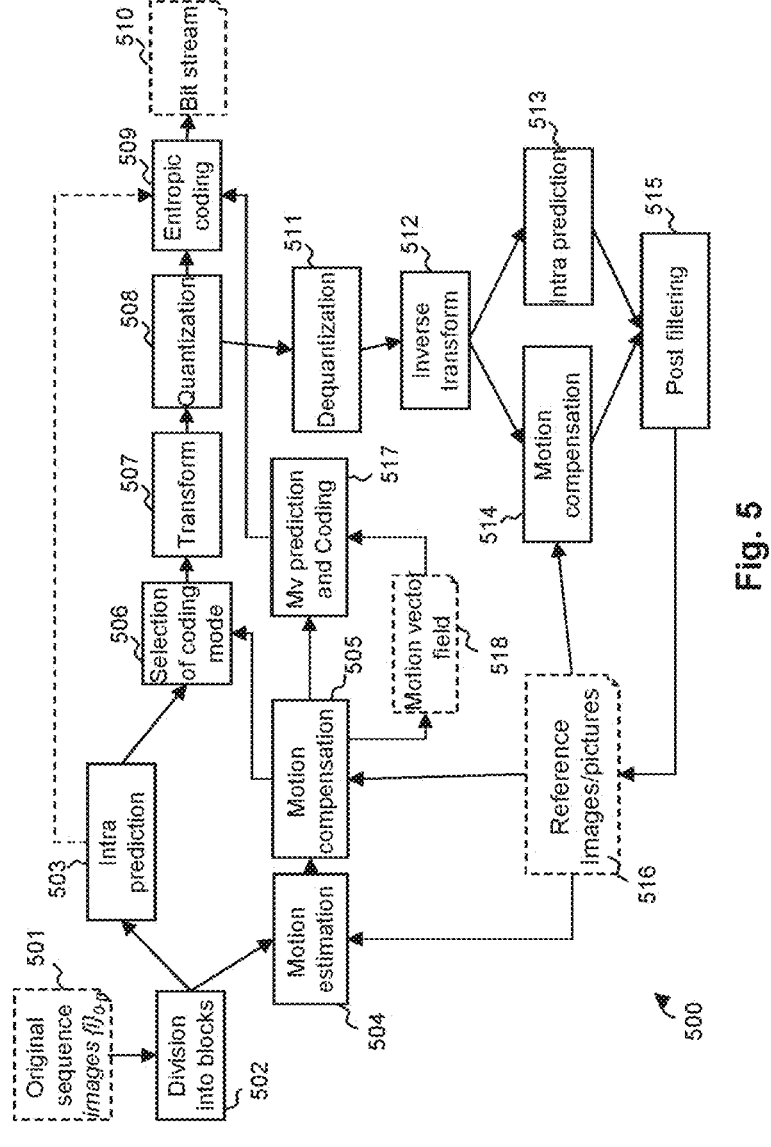
FIG. 5 is a block diagram illustrating components of an encoder in which one or more embodiments of the invention may be implemented.

FIG. 5 illustrates a block diagram of an encoder according to at least one embodiment of the invention. The encoder is represented by connected modules, each module being adapted to implement, for example in the form of programming instructions to be executed by the CPU 411 of device 400, at least one corresponding step of a method implementing at least one embodiment of encoding an image of a sequence of images according to one or more embodiments of the invention.

An original sequence of digital images i0 to in 501 is received as an input by the encoder 500. Each digital image is represented by a set of samples, sometimes also referred to as pixels.

A bitstream 510 is output by the encoder 500 after implementation of the encoding process. The bitstream 510 comprises data for a plurality of encoding units or image portions such as slices, each slice comprising a slice header for transmitting encoding values of encoding parameters used to encode the slice and a slice body, comprising encoded video data.

The input digital images i0 to in 501 are divided into blocks of pixels by module 502. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 503 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 504 and motion compensation module 505. Firstly, a reference image from among a set of reference images 516 is selected, and a portion of the reference image, also called reference area or image portion, which is the closest area (closest in terms of pixel value similarity) to the given block to be encoded, is selected by the motion estimation module 504. Motion compensation module 505 then predicts the block to be encoded using the selected area. The difference between the selected reference area and the given block, also called a residual block, is computed by the motion compensation module 505. The selected reference area is indicated by motion information (e.g. a motion vector).

Thus, in both cases (spatial and temporal prediction), a residual is computed by subtracting the prediction from the original block. The SKIP mode is an exception. Any residual is neglected in this case.

In the INTRA prediction implemented by module 503, a prediction direction is encoded. In the temporal prediction, at least one motion vector is encoded. In the Inter prediction implemented by modules 504, 505, 516, 518, 517, at least one motion vector or information (data) for identifying such motion vector is encoded for the temporal prediction.

Information pertaining to the motion vector and the residual block is encoded if the Inter prediction is selected. To further reduce the bitrate, assuming that motion is homogeneous, the motion vector is encoded by difference with respect to a motion vector predictor. Motion vector predictors of a set of motion information predictors is obtained from the motion vectors field 518 by a motion vector prediction and coding module 517.

The encoder 500 further comprises a selection module 506 for selection of the coding mode by applying an encoding cost criterion, such as a rate-distortion criterion. In order to further reduce redundancies a transform (such as DCT) is applied by transform module 507 to the residual block, the transformed data obtained is then quantized by quantization module 508 and entropy encoded by entropy encoding module 509. Finally, except in the SKIP mode the encoded residual block of the current block being encoded is inserted into the bitstream 510.

The encoder 500 also performs decoding of the encoded image in order to produce a reference image for the motion estimation of the subsequent images. A set 516 of reference images is stored in memory. This enables the encoder and the decoder receiving the bitstream to have the same reference frames. An inverse quantization module 511 performs inverse quantization (dequantization) of the quantized data, followed by an inverse transform by reverse transform module 512. The reverse intra prediction module 513 uses the prediction information to determine which predictor to use for a given block and the reverse motion compensation module 514 actually adds the residual obtained by module 512 to the reference area obtained from the set of reference images 516.

Post filtering is then applied by module 515 to filter the reconstructed frame (image or image portions) of pixels. The resulting filtered and reconstructed frame is added as another reference image in the set 516.

Figure 6:
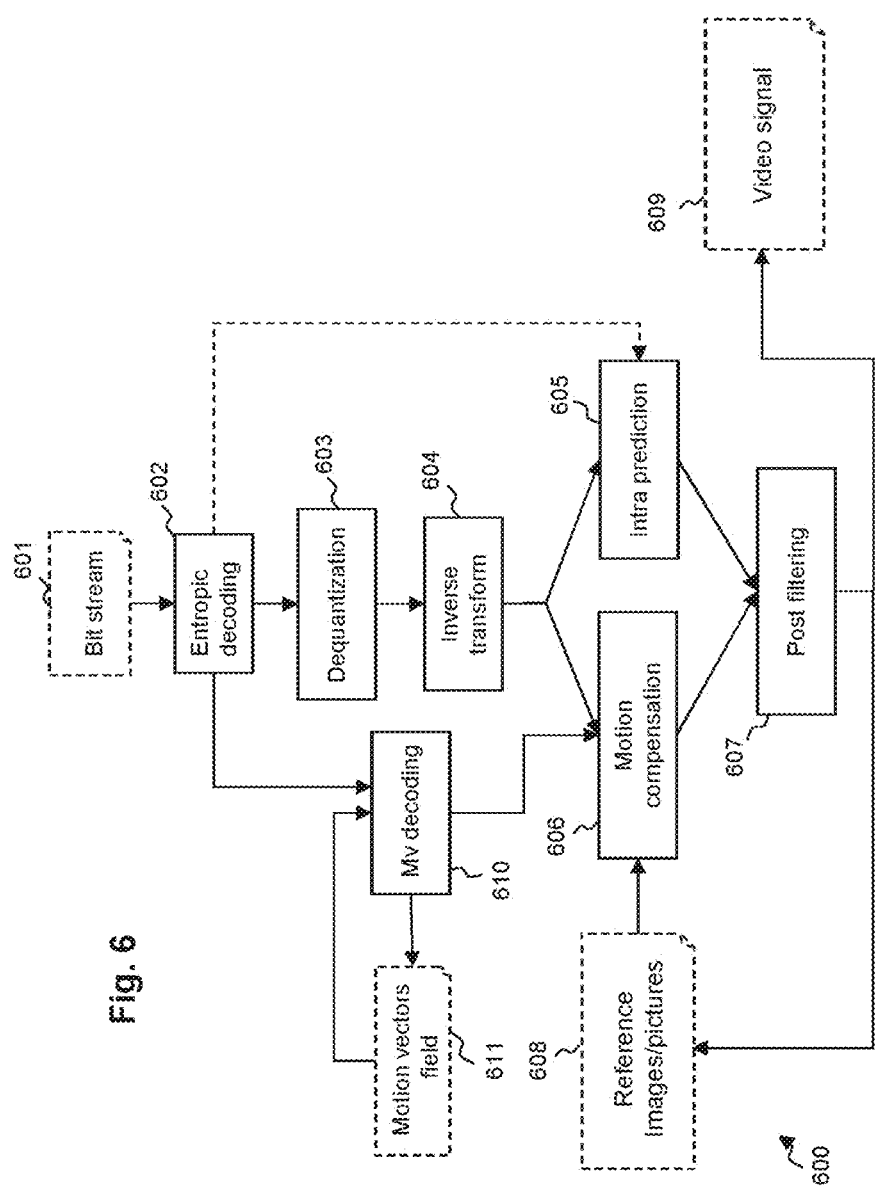
FIG. 6 is a block diagram illustrating components of a decoder in which one or more embodiments of the invention may be implemented.

FIG. 6 illustrates a block diagram of a decoder 600 which may be used to receive data from an encoder according an embodiment of the invention. The decoder is represented by connected modules, each module being adapted to implement, for example in the form of programming instructions to be executed by the CPU 411 of device 400, a corresponding step of a method implemented by the decoder 600.

The decoder 600 receives a bitstream 601 comprising encoding units (e.g. data corresponding to an image option, a block or a coding unit CU), each one being composed of a header containing information on encoding parameters and a body containing the encoded video data. An example structure of the bitstream in VVC was described above with reference to FIG. 2. As explained with respect to FIG. 5, the encoded video data is entropy encoded, and the motion vector predictors' indexes are encoded, for a given image portion (e.g. a block or a CU), on a predetermined number of bits. The received encoded video data is entropy decoded by module 602. The residual data is then dequantized by module 603 and then a reverse transform is applied by module 604 to obtain pixel values.

The mode data indicating the coding mode are also entropy decoded and based on the mode, an INTRA type decoding or an INTER type decoding is performed on the encoded blocks (units/sets/groups) of image data.

In the case of INTRA mode, an INTRA predictor is determined by intra reverse prediction module 605 based on the intra prediction mode specified in the bitstream.

If the mode is INTER, the motion prediction information is extracted from the bitstream so as to find (identify) the reference area used by the encoder. The motion prediction information is composed of the reference frame index and the motion vector residual. The motion vector predictor is added to the motion vector residual by motion vector decoding module 610 in order to obtain the motion vector.

Motion vector decoding module 610 applies motion vector decoding for each image portion (e.g. current block or CU) encoded by motion prediction. Once an index of the motion vector predictor for the current block CU has been obtained, the actual value of the motion vector associated with the image portion (e.g. current block or CU) can be decoded and used to apply reverse motion compensation by module 606. The reference image portion indicated by the decoded motion vector is extracted from a reference image in a set 608 of reference images/pictures so that the module 606 can perform the motion compensation. The motion vector field data 611 is updated with the decoded motion vector in order to be used for the inverse prediction of subsequent decoded motion vectors.

Finally, a decoded block is obtained. Where appropriate, post filtering is applied by post filtering module 607. A decoded video signal 609 is finally provided by the decoder 600.

Figure 7:
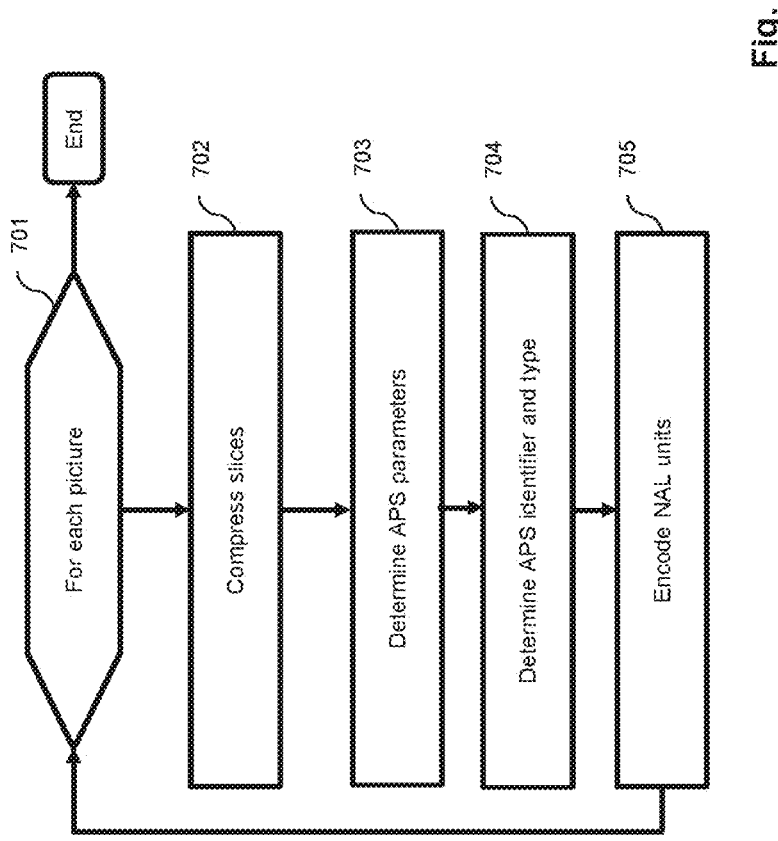
FIG. 7 is a flow chart illustrating an encoding process according to an embodiment of the invention.

FIG. 7 illustrates parts of an encoding method performed by the encoder 500 for encoding a picture of a video into a bitstream according to an embodiment of the invention. A processing loop 701 successively applies steps 702 to 705 to each picture to be encoded. The encoding of a picture starts by the compression of the picture samples into portions which are typically slices. In step 702, the picture is divided into one or more slices and the slices are successively compressed. Compressing a slice involves splitting the slice into coding units, each coding unit being coded, for example using an INTRA or an INTER prediction. In step 703 a set of parameters is determined that configures loop filters such as the adaptive loop filter (ALF) or the LMCS filter. In another example, the scaling parameters for the quantization of the residuals are determined. These parameters are typically coded in an APS.

Each APS has an APS type (e.g. ALF_APS, LMCS_APS or SCALING_APS) and an APS identifier. In step 704 the APS type is set according to the content of the APS container. The encoder maintains a list of identifiers in use per APS type. Each of these lists contains the APS identifiers of the APSs for which APS parameters of the APS type concerned were determined in step 703. Prior to the first iteration of the processing loop 701, each list is initialized in an empty state.

For a given type of APS, step 704 determines an identifier value to associate with a current APS based on previously-determined APSs and their identifier values.

For instance, the following is applied for each type of APS. It is determined if the APS content (the APS parameters) of the current APS is the same as a previous APS with an existing identifier present in the list of previous identifiers of APS of the same type. If so, the existing identifier is associated with the current APS.

Otherwise, because all APSs with an existing identifier present in the list have different content than the current APS, a new identifier has to be associated with the current APS and then inserted in the list. There is a finite number of possible identifier values available for use at any given time and if all possible identified values are already used an existing APS identifier within the list is determined which the current APS will replace in the list. For example, the determined APS may be the APS that is least frequently used or alternatively the oldest one.

In step 705 the encoder then generates the NAL units that contain the encoded data. In particular, it generates the NAL units that contain the APS, the slice NAL units and optionally a picture header NAL unit.

The APS NAL unit signals the type and the identifier of the APS. For example, the syntax elements of the APS may be the following:

| | Descriptor |
|---|---|
| adaptation_parameter_set_rbsp( ) { | |
|     adaptation_parameter_set_id | u(5) |
|     aps_params_type | u(3) |
|     if( aps_params_type = = ALF_APS ) | |
|       alf_data( ) | |
|     else if( aps_params_type = = LMCS_APS ) | |
|       lmcs_data( ) | |
|     else if( aps_params_type = = SCALING_APS ) | |
|       scaling_list_data( ) | |

-continued

| | Descriptor |
|---|---|
| aps_extension_flag | u(1) |
| if( aps_extension_flag ) | |
|    while( more_rbsp_data( ) ) | |
|       aps_extension_data_flag | u(1) |
|   rbsp_trailing_bits( ) | |
| } | |

The adaptation_parameter_set_id syntax element is the identifier value of the APS and aps_params_type the type of the APS. Depending on the APS type ALF parameters alf_data( ), LMCS parameters lmcs_data( )) or scaling list data scaling_list_data( ) may be provided.

In a given Picture Unit the encoder must use a prefix APS NAL unit when the APS is present before the first VCL NAL unit and must use a suffix NAL unit when the APS follows the last VCL of the PU. In between the first and the last VCL NAL unit, encoder may use either prefix or suffix APS NAL units (except stated otherwise in some embodiments of the invention).

The header of the slice NAL unit or the picture header may refer to those APS NAL units by referring to the type and the identifier of the APS. However, because the header of the slice NAL unit or the picture header has syntax elements with prescribed semantics for the APS identifiers, and for each APS type the semantics of the APS identifiers are different, the APS type is implicit in the semantics and can be inferred by the decoder.

The encoder signals that picture header refers to specific APS for loop filter parameters. For example, in the implementation currently contemplated in VVC8 the Picture Header includes the following syntax elements:

| | Descriptor |
|---|---|
| picture_header_structure( ) { | |
| [. . .] | |
|  if( sps_alf_enabled_flag && alf_info_in_ph_flag ) { | |
|   ph_alf_enabled_flag | u(1) |
|   if( ph_alf_enabled_flag ) { | |
|    ph_num_alf_aps_ids_luma | u(3) |
|    for( i = 0; i < ph_num_alf_aps_ids_luma; i++ ) | |
|     ph_alf_aps_id_luma[ i ] | u(3) |
|    if( ChromaArrayType != 0 ) | |
|     ph_alf_chroma_idc | u(2) |
|    if( ph_alf_chroma_idc > 0 ) | |
|     ph_alf_aps_id_chroma | u(3) |
|    if( sps_ccalf_enabled_flag ) { | |
|     ph_cc_alf_cb_enabled_flag | u(1) |
|     if( ph_cc_alf_cb_enabled_flag ) | |
|      ph_cc_alf_cb_aps_id | u(3) |
|     ph_cc_alf_cr_enabled_flag | u(1) |
|     if( ph_cc_alf_cr_enabled_flag ) | |
|      ph_cc_alf_cr_aps_id | u(3) |
|    } | |
|   } | |
|  } | |
|  if( sps_lmcs_enabled_flag ) { | |
|   ph_lmcs_enabled_flag | u(1) |
|   if( ph_lmcs_enabled_flag ) { | |
|    ph_lmcs_aps_id | u(2) |
|    if( ChromaArrayType != 0 ) | |
|     ph_chroma_residual_scale_flag | u(1) |
|   } | |
|  } | |
|  if( sps_explicit_scaling_list_enabled_flag ) { | |

-continued

| | Descriptor |
|---|---|
|   ph_explicit_scaling_list_enabled_flag | u(1) |
|   if( ph_explicit_scaling_list_enabled_flag ) | |
|    ph_scaling_list_aps_id | u(3) |
|  } | |

The picture header in this contemplated implementation includes several ALF APS identifiers for applying the ALF filtering on the slices of the PU. These identifiers are specified for example by ph_alf_aps_id_luma[i] syntax elements with i in range of 0 to ph_num_alf_aps_ids_luma. ph_num_alf_aps_ids_luma specifies the number of APS identifiers signalled in the picture header for the ALF filtering of the luma component. In addition, ph_alf_aps_id_chroma, ph_cc_alf_cb_aps_id and ph_cc_alf_cr_aps_id syntax elements specify the ALF APS identifiers for chroma components.

The picture header in this contemplated implementation also comprises a ph_lmcs_aps_id syntax element which indicates the identifier of the APS with LMCS_APS type (i.e. aps_params_type) that contains the LMCS parameters that apply to the current PU.

Similarly, the picture header comprises a ph_scaling_list_aps_id which specifies the identifier of the APS with aps_params_type equal to SCALING_APS that defines the scaling list data used for the current PU.

Not all the different APS types need be used in embodiments of the present in invention and alternative implementations may be envisaged with just one or two of the APS types. Also, it doesn't matter what the particular APS types are. Parameters for filters other than ALF may be contemplated, for example. Parameters are also not limited to filtering parameters, either.

When the APS in use is different for each slice of the PU, or for two or more slices of the PU, the APS identifiers may be signalled for one or more slices in the Picture Header. Alternatively, the APS identifier may be signalled in the slice headers instead of (or as overriding values) in the picture header NAL unit. For example, in one implementation contemplated in VVC8, the slice header may include the following syntax elements:

| | Descriptor |
|---|---|
| slice_header( ) { | |
|  [. . .] | ue(v) |
|  if( sps_alf_enabled_flag && !alf_info_in_ph_flag ) { | |
|   slice_alf_enabled_flag | u(1) |
|   if( slice_alf_enabled_flag ) { | |
|    slice_num_alf_aps_ids_luma | u(3) |
|    for( i = 0; i < slice_num_alf_aps_ids_luma; i++ ) | |
|     slice_alf_aps_id_luma[ i ] | u(3) |
|    if( ChromaArrayType != 0 ) | |
|     slice_alf_chroma_idc | u(2) |
|    if( slice_alf_chroma_idc ) | |
|     slice_alf_aps_id_chroma | u(3) |
|    if( sps_ccalf_enabled_flag ) { | |
|     slice_cc_alf_cb_enabled_flag | u(1) |
|     if( slice_cc_alf_cb_enabled_flag ) | |
|      slice_cc_alf_cb_aps_id | u(3) |
|     slice_cc_alf_cr_enabled_flag | u(1) |
|     if( slice_cc_alf_cr_enabled_flag ) | |
|      slice_cc_alf_cr_aps_id | u(3) |
|    } | |
|   } | |
|  } | |

The slice header may for example define the slice_alf_aps_id_luma[i] which is the i-th ALF APS identifier used by the slice for luma component. As for the picture header, the slice_alf_aps_id_chroma, slice_cc_alf_cb_aps_id and slice_cc_alf_cr_aps_id may indicate the identifiers of the ALF APS for the chroma components.

Figure 8:
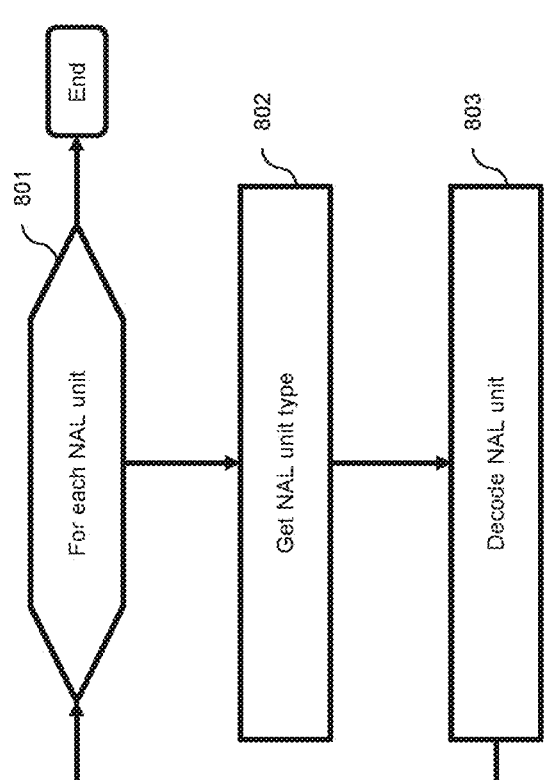
FIG. 8 is a flow chart illustrating a decoding process according to an embodiment of the invention.

FIG. 8 illustrates the general decoding process of a coded video sequence according to an embodiment of the invention. The decoding process of the NAL units constituting the coded video sequence involves using a loop 801 to successively process the NAL units of a picture unit of the coded video sequence. For each NAL unit, in step 802 the decoder determines the type of the NAL unit by parsing the NAL unit header. For example in VVC, the NAL unit header is 2 bytes long and contains five syntax elements in the following order:

| | Descriptor |
|---|---|
| nal_unit_header( ) { | |
|    forbidden_zero_bit | f(1) |
|    nuh_reserved_zero_bit | u(1) |
|    nuh_layer_id | u(6) |
|    nal_unit_type | u(5) |
|    nuh_temporal_id_plus1 | u(3) |
| } | |

First forbidden_zero_bit is a bit which should normally be equal to 0. When equal to 1, the content of the NAL unit is unspecified and should be ignored by a conformant decoder. Then, a nuh_reserved_zero_bit is a bit that is equal to 0. A nuh_layer_id is an integer value represented by 6 bits. It specifies an identifier of a layer in the coded video sequence. This syntax element is followed by the nal_unit_type which is an integer coded on 5 bits and represents the type of the NAL unit. A unique value is assigned for each different type of NAL unit. For example, for a prefix APS NAL unit nal_unit_type may be equal to 17 and for a suffix APS NAL unit nal_unit_type may be equal to 18. Finally, the last three bits of the 2-byte NAL unit header code a nuh_temporal_id_plus1 syntax element. It indicates a temporal level of the NAL unit.

Then, the decoding process continues in step 803 with the decoding of the NAL unit data accordingly to the type of the NAL unit.

Figure 9:
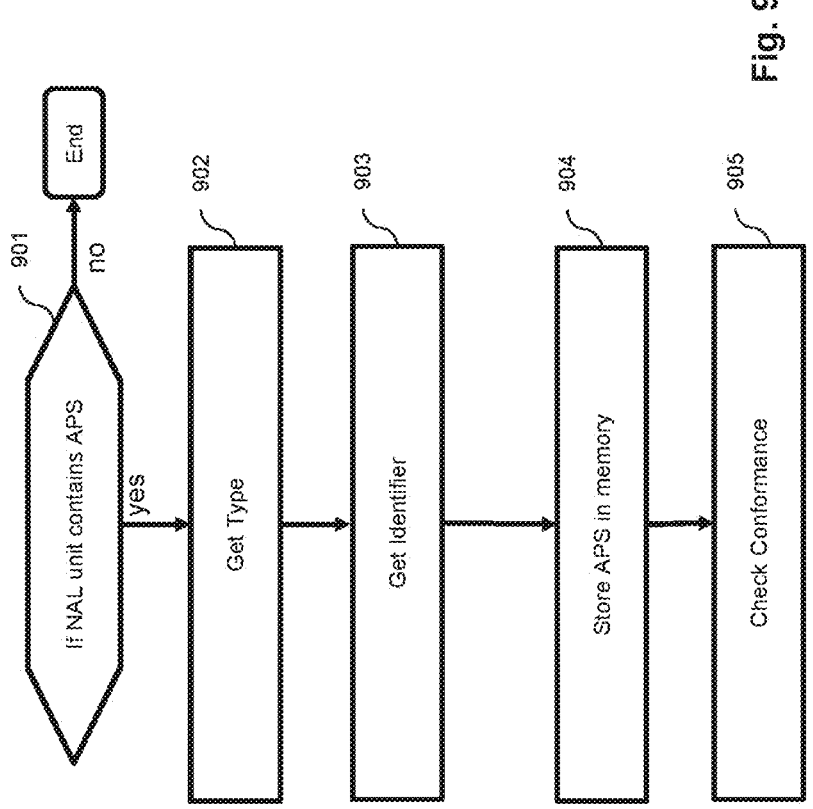
FIG. 9 is a flow chart illustrating in more detail parts of the decoding process of FIG. 8.

In particular, referring now to FIG. 9, it is checked in step 901 whether the NAL unit contains an APS. If so, prefix and suffix APS NAL units (nal_unit_type equal to 17 or 18 for VVC8) are decoded as follows: first, the decoder parses the type of the APS (specified in the aps_params_type syntax element of the APS) in step 902 and the identifier (adaptation_parameter_set_id syntax element) of the APS NAL unit in step 903.

In step 904 the decoder then stores in memory the APS data contained in the NAL unit. The APS data is associated with a pair of values corresponding to the type and identifier parsed in steps 902 and 903. In addition, the decoder may also associate with the stored APS data a boolean value that specifies if the present APS is provided as a suffix or a prefix NAL unit.

In addition, the decoder may store position data representing the position of the present APS NAL unit relative to other NAL units. For example, the position of the present APS NAL unit may be represented by a combination of an index of the NAL unit from the beginning of the coded video sequence and an index of the PU that it belongs to. This information makes it possible for a decoder to determine the APS data to use when a slice or a picture header NAL unit refers to an APS with a pair of APS type and APS identifier values.

The part of the memory where the APS data is stored may be referred to as an APS buffer.

Figure 10:
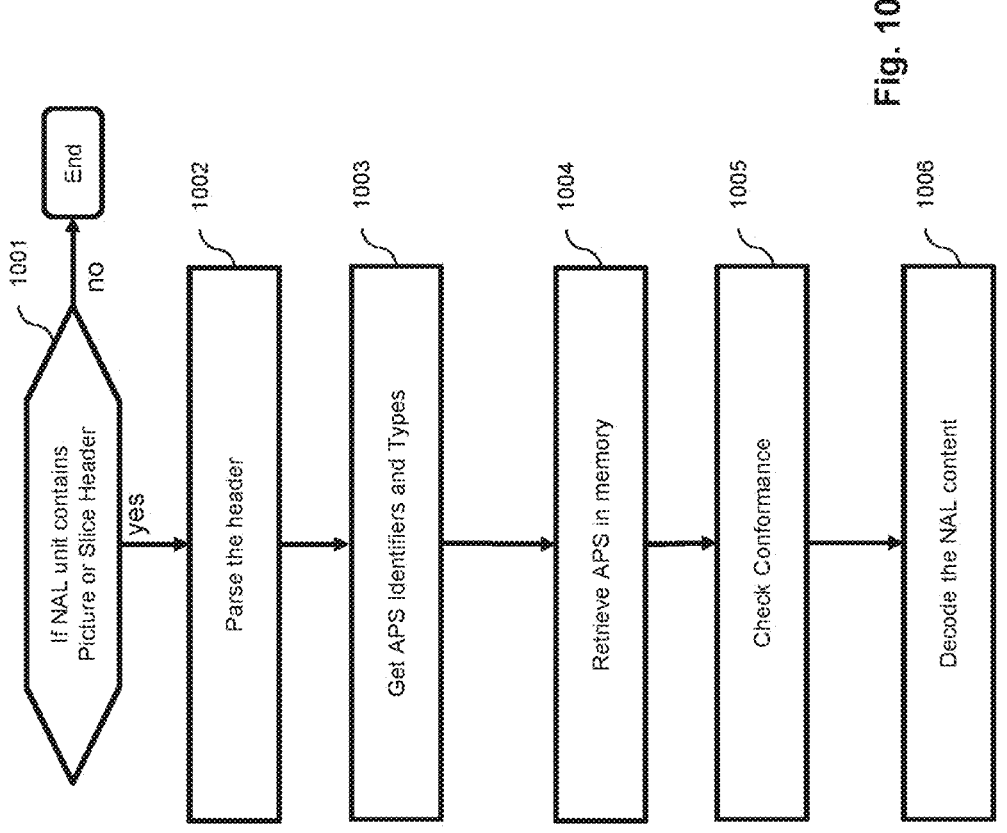
FIG. 10 is a flow chart illustrating in more detail further parts of the decoding process of FIG. 8.

The decoding process of the VCL (i.e. containing a slice header) and Picture Header (PH) NAL units is illustrated in FIG. 10.

In step 1001 the decoder checks first if the NAL unit type corresponds to a VCL or PH NAL unit. For VVC8, it corresponds to nal_unit_type in the range from 0 to 12 or, in the case of the Picture Header, equal to 19. When it is verified that the NAL unit is a VCL/PH NAL unit, the decoder applies steps 1002 to 1006. In step 1002 the slice or picture header contained in the NAL unit is parsed to determine the references to an APS. For each APS type, the decoder maintains a list of references using the APS identifiers.

First, when the NAL unit contains a picture header, the references to APSs may apply for all slices of the PU. The APS identifiers and APS types present in the picture header are extracted and, for each APS type, a list of references to APSs of the APS type concerned is updated in step 1003.

Step 1003 involves parsing the values of the following syntax elements when present:

the ph_lmcs_aps_id syntax element, which indicates the APS identifier of any APS of APS type LMCS_APS. When not present, LMCS filtering may not apply and nothing is inserted in the list of references to APSs of this APS type. Otherwise, the parsed value is added to the list associated with LMCS_APS type.

the ph_scaling_list_aps_id syntax element, which specifies the identifier of APS with type equal to SCALING_APS. When not present, the scaling list may use default values and the list of references to APSs of this APS type is unchanged. Otherwise, the decoder adds the parsed value to the list associated with SCALING_APS type.

the ph_alf_aps_id_luma[ i] with i in range of 0 to ph_num_alf_aps_ids_luma and/or ph_cc_alf_cb_aps_id and/or ph_cc_alf_cr_aps_id and/or ph_alf_aps_id_chroma syntax elements. These syntax elements indicate the identifiers of APSs with type equal to ALF_APS. When not present for a component, it may indicate that ALF is not applied to the component concerned or it uses default values. The list for this APS type is maintained unchanged. Otherwise, each of the parsed values is added to the list associated with ALF_APS type.

When the NAL unit is a VCL NAL unit (the nal_unit_type is in the range from 0 to 12 for VVC8), it contains a slice header. This slice header may include references to APSs that have been found by parsing the slice header in the step 1002. For example, the slice_alf_aps_id_luma[ i], slice_alf_aps_id_chroma, slice_cc_alf_cb_aps_id and slice_cc_alf_cr_aps_id syntax elements of the slice header indicate a reference to an ALF APS in VVC8. When present in the slice header, the decoder stores the parsed identifier value in the list of referenced APSs associated with ALF_APS type in step 1003.

Then, in step 1004 the decoder retrieves from the APS buffer filled in step 904 the APSs with types and identifiers present in the list of APS references determined in step 1003. These APSs are marked in-use for the decoding of VCL NAL units of the current PU. Optionally, in step 1005, the decoder checks that a reference to an APS contained in the picture header or slice header is valid. For instance, if after updating the lists of references in step 1003 a list contains a reference to an APS which is not present in the APS buffer, in the sense that no APS with the same APS type and APS identifier is present in the APS buffer, the decoder may return an error and the decoder may stop the decoding of the slice or PU. Indeed, all the APSs required for decoding a slice or picture header of one Picture Unit must be provided prior to the NAL unit that makes the reference to the APS.

In step 1006 the NAL unit is decoded. In the case of a PH NAL unit, decoding of the picture header consists mainly in parsing the parameters provided in NAL unit. They are stored in a memory for the decoding of the VCL NAL units of PU to which the PH belongs. The decoding of the VCL NAL units involves decoding the coding units. The decoder typically uses the parameters parsed in the picture header NAL unit (and also other non-VCL NAL units) to decode the pixel values. In particular, it uses the lists of references to APSs as updated in step 1003 to access the APSs in the APS buffer and then applies the LMCS, scaling transform and ALF filtering using the APS parameters of the referenced APSs.

Returning to FIG. 8 in step 802 the decoder may determine other NAL unit types than APS, PH and VCL NAL units such as Parameter Set NAL units and SEI messages. In that case, the decoding of the NAL unit in step 803 involves parsing the parameters present in the NAL unit and storing them in memory for the decoding of the VCL NAL unit that may refer to them.

First Group of Embodiments

The proposed VVC8 syntax structures described above may lead to certain problems in practice. For example, the size of the APS buffer needed to store in-use APSs may be excessive. Also, the amount of processing required to manage the APSs may also be excessive. These problems are explained hereinafter with reference to FIG. 11A.

Figures 11A, 11B:
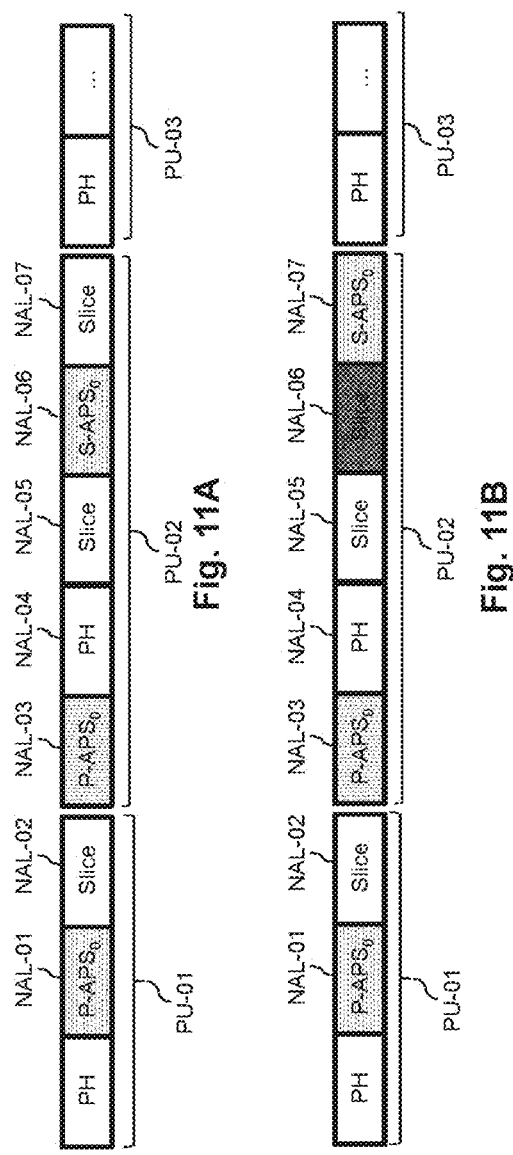
FIG. 11A illustrates an example of a bitstream compliant with VVC8.
FIG. 11B illustrates a bitstream according to an embodiment of the invention.

FIG. 11A illustrates an example bitstream compliant with VVC8. To be compliant VVC8 requires that in a given Picture Unit:

(a) if an APS is present in a picture unit before a first VCL NAL of the picture unit concerned the APS must be contained in a prefix APS NAL unit; and (b) if an APS is present in a picture unit after a last VCL NAL of the picture unit concerned the APS must be contained in a suffix APS NAL unit.

On the other hand, in between the first and last VCL NAL units of the PU, the encoder may use either prefix or suffix APS NAL units.

There is a further constraint:

(c) a prefix or a suffix APS NAL unit associated with a particular VCL NAL unit is not for use by the particular VCL NAL unit, but for use by VCL NAL units following the prefix or suffix APS NAL unit in decoding order.

VVC8 defines associations between VCL and non-VCL NAL units as follows:

(1) associated non-VCL NAL unit: A non-VCL NAL unit (when present) for a VCL NAL unit where the VCL NAL unit is the associated VCL NAL unit of the non-VCL NAL unit.

(2) associated VCL NAL unit: The preceding VCL NAL unit in decoding order for a non-VCL NAL unit with nal_unit_type equal to EOS_NUT, EOB_NUT, SUF-FIX_APS_NUT, SUFFIX_SEI_NUT, FD_NUT, RSV_NVCL_27, or in the range of UNSPEC_30.. UNSPEC_31; or otherwise the next VCL NAL unit in decoding order.

The effect of these definitions is that the VCL NAL unit associated with a suffix NAL unit is the VCL NAL unit that precedes the suffix APS NAL unit concerned in decoding order and the VCL NAL unit associated with a prefix NAL unit is the VCL NAL unit that follows the suffix APS NAL unit concerned in decoding order.

The compliant bitstream of FIG. 11A has NAL units of three Picture Units, PU-01, PU-02 and PU-03.

The first Picture Unit PU-01 has a PH NAL unit followed by a NAL unit NAL-01 which is a prefix APS NAL unit. This prefix APS NAL unit provides an APS of a first APS type (e.g. ALF type) with an identifier equal to 0. In FIG. 11A, the first APS type is denoted by horizontal hatching. In PU-01 a single slice NAL unit NAL-02 follows the prefix APS NAL unit NAL-01. This slice refers to the APS with the APS identifier of 0 (e.g. slice_alf_aps_luma[0] equals 0).

In the second Picture Unit PU-02, the first NAL unit NAL-03 is a prefix NAL unit that also has an identifier equal to 0 but with a different type (e.g. it contains LCMS parameters). This second APS type (e.g. LMCS type) is denoted by vertical hatching. Then, a Picture Header (PH) NAL unit NAL-04 refers to this APS for LMCS parameters by indicating ph_lmcs_aps_id equal to 0. The slice NAL unit NAL-05 that follows refers to the ALF APS with identifier equal to 0 that was provided in the NAL unit NAL-01 of the previous Picture Unit PU-01. Note that the slice NAL unit NAL-05 is associated with the suffix APS NAL unit NAL-06 because it precedes it in the decoding order. That means that under constraint (c) the VCL NAL unit NAL-05 could not use the APS of the suffix APS NAL unit NAL-06.

The Picture Unit PU-02 also contains a suffix APS NAL unit NAL-06 that contains an ALF APS with identifier equal 0. This APS has the same type (ALF, horizontal hatching) and the same identifier (0) as the APS of the NAL unit NAL-01. The encoder therefore updates the APS of ALF type and identifier 0 to be the APS of the NAL unit NAL-06. The slice NAL unit NAL-07 refers to the ALF APS with identifier equal to 0 and thus refers to the ALF APS of NAL-06. This is consistent with constraint (c) because NAL-07 follows NAL-06 in the decoding order. Therefore NAL-07 is not a VCL NAL unit associated with the APS NAL unit NAL-06.

In this example bitstream, the slices NAL-05 and NAL-07 of PU-02 refer respectively to two different ALF APSs using the same identifier values but the order of APS NAL units in the bitstream implies that the ALF APS parameters used for the two slices concerned are different (or are permitted to be different; there is nothing precluding the encoder from making the contents of NAL-01 and NAL-06 identical). As a result, to decode the bitstream of FIG. 11A, the decoder has to store in memory (in step 904 of FIG. 9) two versions of an APS for a given pair of values of APS identifier and APS type. In worst-case example, the decoder may have to double the memory size (to maintain two versions of each APS) to store the APSs needed to decode a Picture Unit. In addition, the decoder has to maintain the order of the VCL NAL units relative to the APS NAL units in order to determine which VCL NAL units refer to the first or to the second version of the APS NAL unit.

To solve these problems, the first group of embodiments impose further constraints on the syntax structure to ensure that a slice of a PU refers to a single version of APS.

Incidentally, in VVC8 only ALF parameters (and not LMCS parameters or scaling lists) are permitted to vary from one slice to another in the same picture unit. However, future versions of VVC may allow APS parameters in general to change and the following embodiments are not limited to solving the problem of two or more versions of ALF APS parameters for slices of a PU.

First Embodiment

In a first embodiment, it is a further constraint of the bitstream encoding (in addition to VVC8 constraints) that
(d1) a prefix APS NAL unit has to be prior to the VCL NAL units of a PU (i.e. the first slice NAL unit of the Picture Unit).

In other words, the freedom of VVC8 is constrained so that in between the first and last VCL NAL units of the PU, the encoder may not use prefix APS NAL units. As a result, it prevents the update of an APS sent in a previous Picture Unit after the first VCL NAL unit. The update is made prior to the first VCL NAL unit and thus the first VCL NAL unit (or any subsequent VCL NAL unit of the Picture Unit) cannot refer to a previous version of an APS updated in the current Picture Unit.

The decoder checks that the constraints for the bitstream are valid in in step 1005. If not, the decoder may abort the decoding process.

The encoder generates NAL units in step 705 such that the bitstream constraints are valid. For example, the encoder generates prefix NAL units only prior to the first VCL NAL unit in each PU.

Second Embodiment

In a second embodiment, it is a further constraint of the bitstream encoding (in addition to VVC8 constraints) that
(d2) the suffix APS NAL units are after the (last) VCL NAL units.

Similarly to the constraint (d1) for prefix NAL units imposed in the first embodiment, it prevents the update of an APS sent in a previous PU before the last VCL NAL unit. The APS in the suffix cannot update an APS sent in a previous PU. For example, the bitstream of FIG. 11A is not conformant since the suffix APS NAL-06 is sent prior to the last VCL NAL unit NAL-07 of Picture Unit PU-02. A decoder may thus consider in step 1005 that the bitstream is not conformant and may return a decoding warning or error to notify the issue.

Third Embodiment

The further constraints (d1) and (d2) of the first and second embodiments may of course both be imposed in combination.

FIG. 11B is an example of the bitstream generated with an encoder according to the second or third embodiment of the invention. In this example, the Picture Units PU-01, PU-02 and PU-03 are equivalent to the Picture Units in FIG. 11A. The main difference is that the encoder constrains (in step 704) the order of the APS NAL unit NAL-07 in the PU-02: the equivalent of suffix APS NAL-06 of the Picture Unit PU-02 in FIG. 11A is sent after the last VCL NAL unit (now NAL-06) in the Picture Unit PU-02 in FIG. 11B as NAL-07. The slices in the two NAL units NAL-05 and NAL-06 refer to the ALF APS with identifier 0 and type equal to ALF: either an APS sent in a prefix APS sent in previous PU or at the beginning of the current PU or an APS sent in a suffix APS sent in previous PU only.

The decoding 904 is more effective in terms of memory consumption since a single version of APS is required to decode all the slices of PU.

In addition, these APSs are provided either in a previous PU or at the beginning of the current PU, which simplifies the updating process of the APS buffer. Decoding the first VCL NAL unit of a PU is the confirmation that the APS buffer state is ready for decoding which is not the case for VVC8-conformant bitstreams. Furthermore, the step 1004 which has to select the appropriate version of an APS with a given identifier and type is simplified since the invention ensures that all slices of a PU will use a unique version of the APS.

Although FIG. 11B presents an example of the second/third embodiment, it will be understood that the same or corresponding advantages are achieved in the first embodiment. The best advantage is achieved when the constraints (d1) and (d2) of the first and second embodiments are used in combination.

Second Group of Embodiments

Another problem that arises from the VVC8 syntax structures is addressed by a second group of embodiments described below.

APS in VVC8 makes it possible to reuse parameters for one or more slices of a bitstream. These one or more slices may belong to different Picture Units. For example, the bitstream of FIG. 12A has three Picture Units PU-01, PU-02 and PU-03. PU-01 contains two prefix APS NAL units NAL-02 and NAL-06 and two suffix APS NAL units NAL-04 and NAL-08. In this example, they are interleaved with the VCL NAL units NAL-03, NAL-05 and NAL-08 of the picture unit PU-01. The APSs of NAL-02, NAL-04 and NAL-06 are of different APS types, for example ALF, scaling list and LMCS respectively, but have the same identifier 0. The APS of NAL-08 is of ALF type, like the APS of NAL-02, and has the identifier 1.

The picture unit PU-02 contains two slice NAL units NAL-09 and NAL-10. The encoder determines in step 703 that the APSs of PU-01 are valid for the next PU PU-02. The slice NAL-09 may for instance refer to NAL-06 and the slice NAL-10 to NAL-08. While encoding the PU PU-02, the encoder determines that the APS of type LMCS with identifier equal to 0 needs updating based on the content of the slice NAL-10. For this reason, it has generated new parameters for APS of type LMCS with identifier 0. A suffix APS NAL unit NAL-11 includes this APS since the NAL unit NAL-11 is after the last VCL NAL unit NAL-10 (according to constraint (a) above a prefix APS NAL unit cannot follow the last VCL NAL unit of a PU).

Figures 12A, 12B, 12C, 12D:
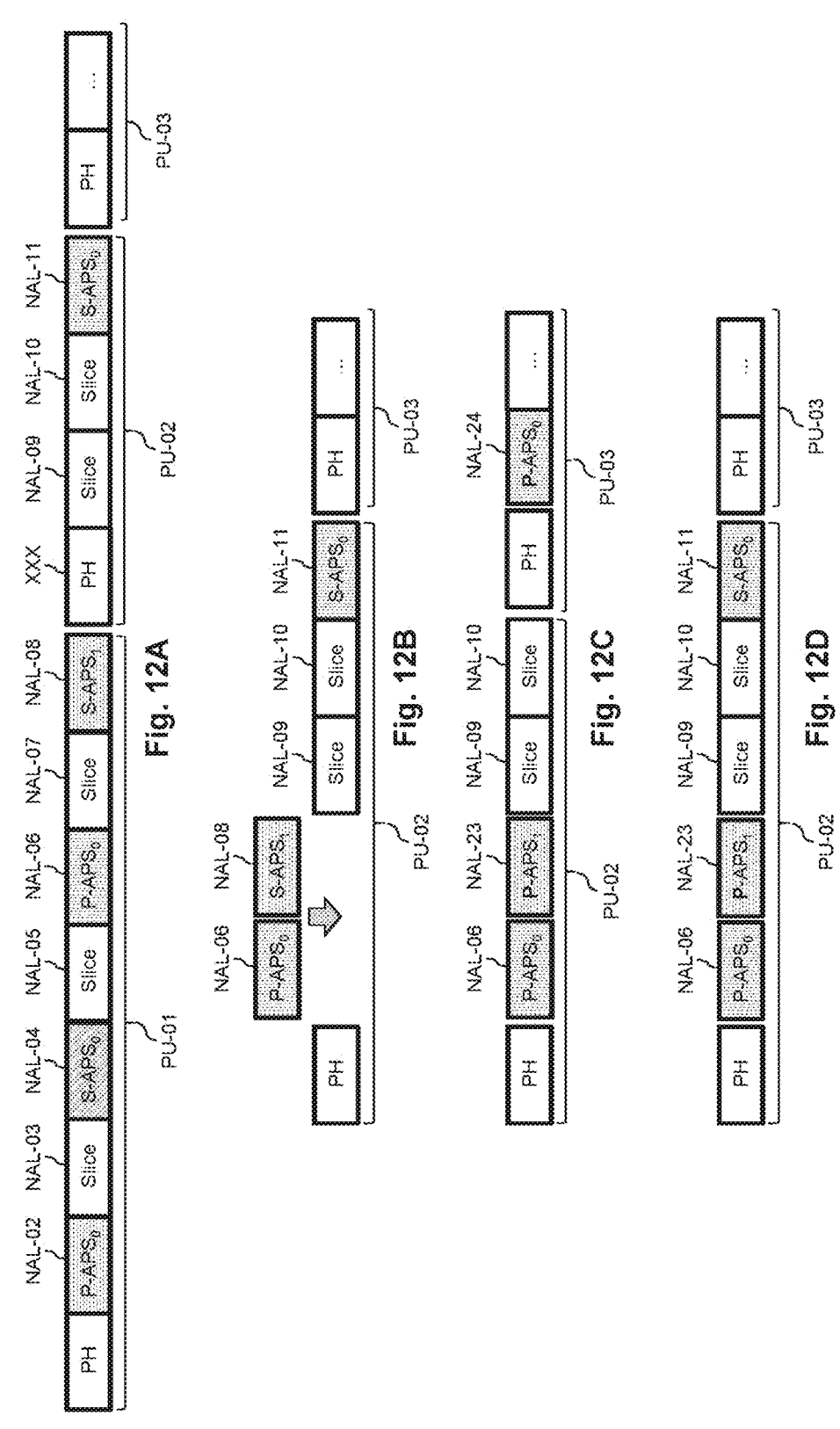
FIG. 12A illustrates another example of a bitstream compliant with VVC8.
FIG. 12B illustrates first modifications of the bitstream of FIG. 12A when random access is required.
FIG. 12C illustrates second modifications of the bitstream of FIG. 12A when random access is required.
FIG. 12D illustrates a bitstream corresponding to the example of FIG. 12A according to an embodiment of the invention.

When an application performs random access into the bitstream to start the decoding at the picture unit PU-02 (assuming PU-02 is a random access point), the application has to provide the NAL units NAL-06 and NAL-08 prior to the slice NAL units of PU PU-02. As a result, it inserts NAL-06 and NAL-08 at the beginning of PU PU-02 prior to the NAL unit NAL-09 as represented in FIG. 12B. This resulting bitstream illustrated in FIG. 12B breaks two constraints of VVC8. It will make the step 1005 of the decoding enter an error state.

Firstly, NAL-08 is a suffix APS NAL unit before the first VCL NAL unit of the PU and according to constraint (a) above the encoder must use a prefix APS NAL unit when the APS is sent before the first VCL NAL of the PU. In the example of FIG. 12B, the suffix NAL unit NAL-08 is inserted prior to the first VCL NAL unit of the PU PU-02, which is not conformant to VVC.

Secondly, the PU-02 has suffix and prefix APS NAL units NAL-11 and NAL-06 which contain APSs with the same identifier (0) and type (LMCS) but with different contents which is not allowed in VVC8.

The application has thus to rewrite the type (nal_unit_type) of the prefix APS NAL unit NAL-08 to generate a new prefix APS NAL unit NAL-23 (nal_unit_type is set equal to 18) as represented in FIG. 12C. In addition, the application has to move and rewrite the suffix APS NAL unit NAL-11 of FIG. 12B as a new prefix APS NAL unit NAL-24 at the beginning of the PU PU-03. If this PU-03 PU also happens to contain an APS NAL unit with same identifier and type as NAL-24, the application may also have to move and rewrite them.

These moving operations to make the bitstream conform to VVC8 are costly since in the worst case they may require rewriting all the APS NAL units of the PU after the random accessed picture unit.

To solve these problems, the second group of embodiments impose, remove or modify constraints on the syntax structure to ensure that there are fewer, or even no, rewriting operations.

Fourth Embodiment

In VVC8, it is a constraint (in addition to the constraints (a) and (b) mentioned above) that any APSs with the same APS type and the same identifier must have the same content. This constraint applies even if the APSs are different in the sense of being different APS NAL unit types—suffix and prefix. In other words, if new APS parameters different from existing APS parameters are needed, the encoder has to allocate a different APS type and identifier combination to the APS NAL unit bearing the new APS parameters or, if there are no free combinations left to use, it must replace an existing APS such as the oldest existing APS.

In a fourth embodiment the decoder allows suffix and prefix APS NAL units with same types and identifiers to have different contents. As a result, a bitstream is valid (i.e. passes the conformity check in step 1005) if following statement is valid for a bitstream conforming to the fourth embodiment:

(e) all APS NAL units with a particular NAL unit type (nal_unit_type) and a particular value of adaptation_parameter_set_id and a particular value of aps_params_type within a PU shall have the same content As a result, the moving operation of the NAL unit NAL-11 is not necessary since the NAL unit NAL-06 (a prefix APS NAL unit) has a NAL unit type different from the NAL unit NAL-11 (a suffix APS NAL unit). FIG. 12D represents the bitstream without the moving operation for the NAL unit NAL-11.

Fifth Embodiment

The fourth embodiment described above allows prefix and suffix APS NAL units with same identifier and type of APS to have different contents. However, one consequence of this modification is to make it possible to update an APS between two slices by using different types of NAL units for providing the APSs. For example, referring now to FIG. 13 the PU PU-01 starts with a Picture Header NAL unit NAL-01. This PU contains two APS NAL units NAL-02 and NAL-04 that contain APSs with the same identifier and same type but different contents. NAL-02 is a prefix NAL unit and NAL-04 is a suffix NAL unit. As a result, the slice NAL-03 may refer to the APS parameters in the NAL-02 APS NAL unit while the slice NAL-05 refers to the parameters in the NAL-04 APS NAL unit. As a result, the decoding of the PU PU-01 requires additional memory to store the two versions of the APS with the same combination of type and identifier value.

In the fifth embodiment, the encoder may generate suffix APS NAL units within a given PU with the constraint that no NAL unit of the current PU makes reference to the APS in the suffix APS NAL unit regardless of the position of the suffix APS NAL unit in the PU. A bitstream that contains a suffix APS NAL unit should conform to the following constraint:

(f) a suffix APS NAL unit is not for use by the VCL NAL units of the PU containing the suffix APS NAL unit, but for use by VCL NAL units of the PUs following the suffix APS NAL unit in decoding order.

Figure 13:
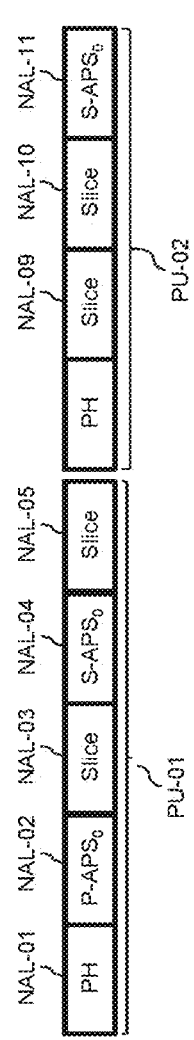
FIG. 13 illustrates a bitstream according to another embodiment of the invention.

With reference to the example of FIG. 13, the suffix APS NAL unit NAL-04 is available only for use by NAL units in subsequent PUs in the fifth embodiment. Thus, the slice NAL-05 cannot refer to the parameters in the suffix APS NAL unit NAL-04. The slices NAL-09 and NAL-10 of the next PU PU-02 may refer to the APS in the suffix APS NAL unit NAL-04. However, since the APS in NAL-04 has the same identifier and type as the APS in NAL-02, these slices (NAL-09 and NAL-10) cannot refer to the initial version of the APS in NAL-02.

Sixth Embodiment

In addition to the constraint of the fifth embodiment that NAL units of a PU shall not refer to APSs within suffix APS NAL units of the PU, a sixth embodiment prohibits certain mixtures of prefix and suffix NAL units in a given PU. It means that (g1) when PREFIX APS NAL units are present in a PU, they shall not follow the last VCL NAL unit of the PU, or a SUFFIX APS NAL unit; and (g2) when SUFFIX APS NAL units are present in a PU, they shall not precede the first VCL NAL unit of the PU, or a PREFIX APS NAL unit.

In other words, the constraint (a) that the encoder must use a prefix APS NAL unit when the APS is sent before the first VCL NAL of the PU and the constraint (b) that the encoder must use a suffix NAL unit when the APS follows the last VCL of the PU still apply. However, the freedom that, in between the first and last VCL NAL units of the PU, the encoder may use either prefix or suffix APS NAL units in any mixture is constrained. Only mixtures where the order is prefix then suffix APS NAL units are permitted. This constraint is independent of the APS type and APS identifier. In a variant, the constraint may be applied for one APS type but not for another APS type.

This simplifies the decoding process since the decoder is able to determine that the list of APSs that may be referred to in a given PU is completed as soon the decoder parses the first suffix APS NAL unit of the bitstream.

Seventh Embodiment

As in the fourth embodiment, the seventh embodiment allows suffix and prefix APS NAL unit with same types and identifiers to have different contents. Constraint (e) therefore applies to a bitstream conforming to the seventh embodiment:

(e) all APS NAL units with a particular NAL unit type, a particular value of adaptation_parameter_set_id and a particular value of aps_params_type within a PU shall have the same content The further constraint of the second embodiment is also imposed:

(d2) suffix APS NAL units must be after the last VCL NAL unit.

This constraint is independent of the APS type and APS identifier. In a variant, the constraint may be applied for one APS type but not for another APS type.

The constraints (a) and (b) of VVC8 still apply. The freedom that, in between the first and last VCL NAL units of the PU, the encoder may use either prefix or suffix APS NAL units in any mixture is constrained by constraint (d2). It prevents any VCL NAL units or Picture Header of a PU from referring to an APS defined in a suffix APS NAL unit. Indeed, to be referenced an APS should be provided prior to the NAL unit that refers it. This last constraint implies that APSs in SUFFIX APS NAL units are after all the NAL units that may reference an APS in a given PU. Only the VCL NAL units from the next PUs in decoding order may refer to these APSs.

Eighth Embodiment

An eighth embodiment builds on any one of the fourth to sixth embodiments and adds the further constraint of the first embodiment (d1) prefix APS NAL units must be prior to the first VCL NAL unit.

The constraints (a) and (b) of VVC8 still apply. The freedom that, in between the first and last VCL NAL units of the PU, the encoder may use either prefix or suffix APS NAL units in any mixture is constrained by constraint (d1).

Not only does this prevent complex rewriting operations but it also ensures that the decoder does not have to buffer two versions of an APS for decoding slices of a given PU as explained in relation to the first embodiment.

Ninth Embodiment

A ninth embodiment builds on the seventh embodiment and adds the further constraint (d1) above that prefix APS NAL units must be prior to the first VCL NAL unit.

The constraints (a) and (b) of VVC8 still apply. The freedom that, in between the first and last VCL NAL units of the PU, the encoder may use either prefix or suffix APS NAL units in any mixture is constrained by constraint (d1).

Not only does this prevent complex rewriting operations but it also ensures that the decoder does not have to buffer two versions of an APS for decoding slices of a given PU as explained in relation to the first embodiment.

Tenth Embodiment

In a tenth embodiment the encoder allows suffix and prefix APS NAL units to have different content when sharing same type and identifier of APS. In addition, the following constraint is required for a conformant bitstream:

(h1) within a PU, a VCL NAL unit that refers to an APS with a particular identifier value and a particular type value shall not be followed by a prefix APS NAL unit that contains an APS with these particular values of identifier and type.

This embodiment makes it possible to provide prefix and suffix APS NAL units between two VCL NAL units. The encoder does not have to buffer the APSs for several VCL NAL units if it needs to generate a new APS NAL units with APS for next PU.

The constraint (h1) ensures that two slices of the same PU would not refer to different APSs (provided in prefix APS NAL units) when using same identifier and type values.

In a variant, the encoder may signal in the SPS if interleaved APS are allowed or not with a flag in the parameter set header such as the PPS or the SPS.

Eleventh Embodiment

In an eleventh embodiment the encoder allows suffix and prefix APS NAL units to have different content when sharing same type and identifier of APS. In addition, the following constraint is required for a conformant bitstream:

(h2) within a PU, a VCL NAL unit that refers to an APS with a particular identifier value and a particular type value shall not be preceded by a suffix APS NAL unit that contains an APS with these particular values of identifier and type.

This embodiment makes it possible to provide prefix and suffix APS NAL units between two VCL NAL units. The encoder does not have to buffer the APSs for several VCL NAL units if it needs to generate a new APS NAL units with APS for next PU.

The constraint (h2) ensures that suffix APS NAL unit are not used for NAL units in a given PU but only by VCL NAL units of subsequent PUs.

In a variant, the encoder may signal in the SPS if interleaved APS are allowed or not with a flag in the parameter set header such as the PPS or the SPS.

Twelfth Embodiment

In a twelfth embodiment the encoder allows suffix and prefix APS NAL units to have different content when sharing same type and identifier of APS. In addition, the constraints (h1) and (h2) applied in the tenth and eleventh embodiments, respectively, are both required for a conformant bitstream.

This embodiment makes it possible to provide prefix and suffix APS NAL units between two VCL NAL units. The encoder does not have to buffer the APSs for several VCL NAL units if it needs to generate a new APS NAL units with APS for next PU.

In a variant, the encoder may signal in the SPS if interleaved APS are allowed or not with a flag in the parameter set header such as the PPS or the SPS.

Further Embodiments of the First Group of Embodiments

Certain measures used in embodiments of the Second Group of Embodiments are also useful for solving the problems addressed by the First Group of Embodiments. Thus, further embodiments of the First Group of Embodiments are contemplated as follows. These further embodiments are not required to solve random access problems and therefore do not involve the constraint (e) of the fourth to twelfth embodiments that all APS NAL units with a particular NAL unit type (nal_unit_type) and a particular value of adaptation_parameter_set_id and a particular value of aps_params_type within a PU shall have the same content.

Thirteenth Embodiment

This embodiment combines the constraints:

(h1) within a PU, a VCL NAL unit that refers to an APS with a particular identifier value and a particular type value shall not be followed by a prefix APS NAL unit that contains an APS with these particular values of identifier and type; and (d2) suffix APS NAL units must be after the last VCL NAL unit.

Fourteenth Embodiment

This embodiment combines the constraints:

(h2) within a PU, a VCL NAL unit that refers to an APS with a particular identifier value and a particular type value shall not be preceded by a suffix APS NAL unit that contains an APS with these particular values of identifier and type; and (d1) prefix APS NAL units must be prior to the first VCL NAL unit.

Fifteenth Embodiment

This embodiment combines the constraints:

(h1) within a PU, a VCL NAL unit that refers to an APS with a particular identifier value and a particular type value shall not be followed by a prefix APS NAL unit that contains an APS with these particular values of identifier and type; and (h2) within a PU, a VCL NAL unit that refers to an APS with a particular identifier value and a particular type value shall not be preceded by a suffix APS NAL unit that contains an APS with these particular values of identifier and type.

Neither the constraint (d1) nor the constraint (d2) is required in this embodiment.

Implementations of Embodiments of the Invention

It is also understood that according to other embodiments of the present invention, a decoder according to an aforementioned embodiment/variant is provided in a user terminal such as a computer, a mobile phone (a cellular phone), a tablet or any other type of a device (e.g. a display apparatus) capable of providing/displaying a content to a user. According to yet another embodiment, an encoder according to an aforementioned embodiment/variant is provided in an image capturing apparatus which also comprises a camera, a video camera or a network camera (e.g. a closed-circuit television or video surveillance camera) which captures and provides the content for the encoder to encode. Two such embodiments are provided below with reference to FIGS. 14 and 15.

Figure 14:
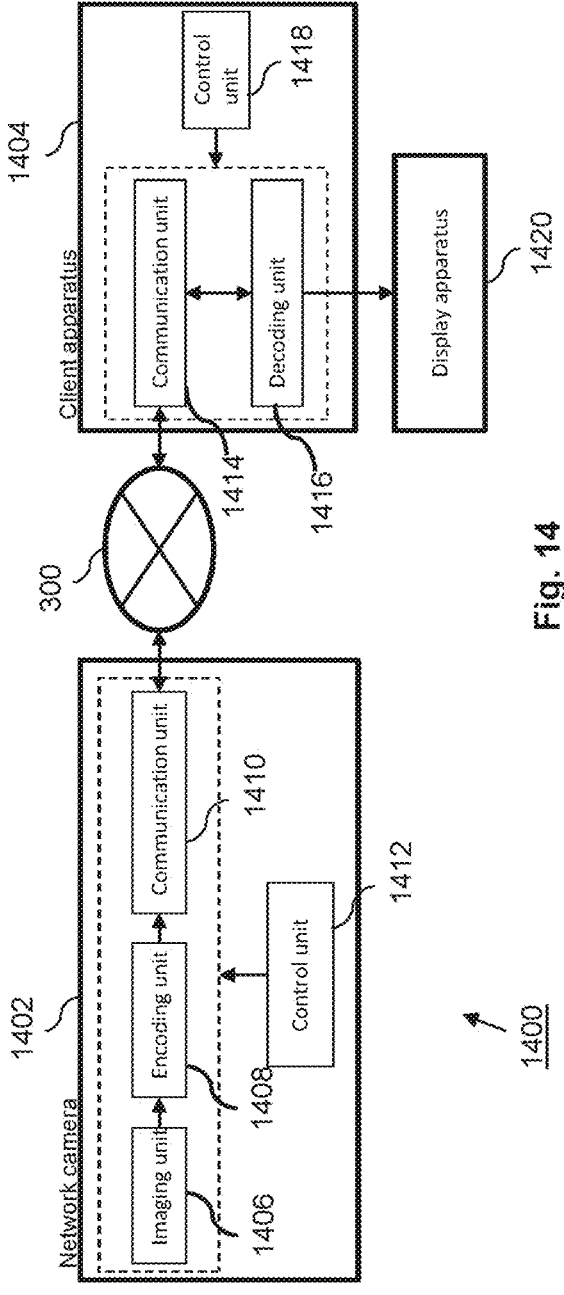
FIG. 14 is a diagram illustrating a network camera system in which one or more embodiments of the invention may be implemented.

FIG. 14 is a diagram illustrating a network camera system 1400 comprising a network camera 1402 and a client apparatus 1404.

The network camera 1402 comprises an imaging unit 1406, an encoding unit 1408, a communication unit 1410, and a control unit 1412. The network camera 1402 and the client apparatus 1404 are mutually connected to be able to communicate with each other via the network 300.

The imaging unit 1406 comprises a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully.

The encoding unit 1408 encodes the image data by using said encoding methods explained in one or more of the foregoing embodiments/variants. The encoding unit 1408 uses at least one of encoding methods explained in the foregoing embodiments/variants. For another instance, the encoding unit 1408 can use a combination of encoding methods explained in the foregoing embodiments/variants.

The communication unit 1410 of the network camera 1402 transmits the encoded image data encoded by the encoding unit 1408 to the client apparatus 1404.

Further, the communication unit 1410 may also receive commands from client apparatus 1404. The commands comprise commands to set parameters for the encoding by the encoding unit 1408.

The control unit 1412 controls other units in the network camera 1402 in accordance with the commands received by the communication unit 1410 or user input.

The client apparatus 1404 comprises a communication unit 1414, a decoding unit 1416, and a control unit 1418.

The communication unit 1414 of the client apparatus 1404 may transmit commands to the network camera 1402. Further, the communication unit 1414 of the client apparatus 1404 receives the encoded image data from the network camera 1402.

The decoding unit 1416 decodes the encoded image data by using said decoding methods explained in one or more of the foregoing embodiments/variants. For another instance, the decoding unit 1416 can use a combination of decoding methods explained in the foregoing embodiments/variants.

The control unit 1418 of the client apparatus 1404 controls other units in the client apparatus 1404 in accordance with the user operation or commands received by the communication unit 1414. The control unit 1418 of the client apparatus 1404 may also control a display apparatus 1420 so as to display an image decoded by the decoding unit 1416.

The control unit 1418 of the client apparatus 1404 may also control the display apparatus 1420 so as to display GUI (Graphical User Interface) to designate values of the parameters for the network camera 1402, for example of the parameters for the encoding by the encoding unit 1408. The control unit 1418 of the client apparatus 1404 may also control other units in the client apparatus 1404 in accordance with user operation input to the GUI displayed by the display apparatus 1420.

The control unit 1418 of the client apparatus 1404 may also control the communication unit 1414 of the client apparatus 1404 so as to transmit commands to the network camera 1402 which designate values of the parameters for the network camera 1402, in accordance with the user operation input to the GUI displayed by the display apparatus 1420.

Figure 15:
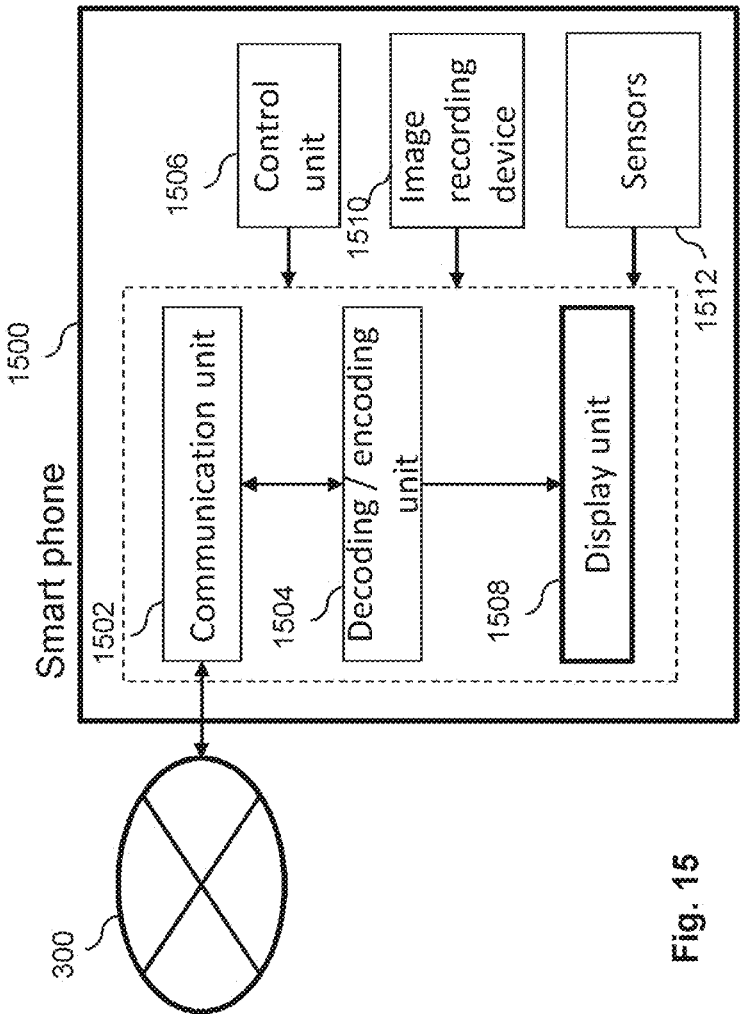
FIG. 15 is a diagram illustrating a smart phone in which one or more embodiments of the invention may be implemented.

FIG. 15 is a diagram illustrating a smart phone 1500.

The smart phone 1500 comprises a communication unit 1502, a decoding/encoding unit 1504, a control unit 1506, and a display unit 1508.

The communication unit 1502 receives the encoded image data via network 9200.

The decoding/encoding unit 1504 decodes the encoded image data received by the communication unit 1502. The decoding/encoding unit 1504 decodes the encoded image data by using said decoding methods explained in one or more of the foregoing embodiments/variants. The decoding/encoding unit 1504 can also use at least one of encoding or decoding methods explained in the foregoing embodiments/variants. For another instance, the decoding/encoding unit 1504 can use a combination of decoding or encoding methods explained in the foregoing embodiments/variants.

The control unit 1506 controls other units in the smart phone 1500 in accordance with a user operation or commands received by the communication unit 1502. For example, the control unit 1506 controls a display unit 1508 so as to display an image decoded by the decoding/encoding unit 1504.

The smart phone may further comprise an image recording device 1510 (for example a digital camera and an associated circuitry) to record images or videos. Such recorded images or videos may be encoded by the decoding/encoding unit 1504 under instruction of the control unit 1506.

The smart phone may further comprise sensors 1512 adapted to sense the orientation of the mobile device. Such sensors could include an accelerometer, gyroscope, compass, global positioning (GPS) unit or similar positional sensors. Such sensors 1512 can determine if the smart phone changes orientation and such information may be used when encoding a video stream.

While the present invention has been described with reference to embodiments and variants thereof, it is to be understood that the invention is not limited to the disclosed embodiments/variants. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, inference, assessment, selection, execution, performing, or consideration described above, for example a selection made during an encoding, processing or partitioning process, may be indicated in or determinable/inferable from data in a bitstream, e.g. a flag or information indicative of the result, so that the indicated or determined/inferred result can be used in the processing instead of actually performing the comparison, determination, assessment, selection, execution, performing, or consideration, e.g. during a decoding or partitioning process. It is understood that when a "table" or a "lookup table" is used, other data types such as an array may also be used to perform the same function, as long as that data type is capable of performing the same function (e.g. representing a relationship/mapping among different elements).

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Reference numerals appearing in the claims are by way of illustration only and shall have no limiting effect on the scope of the claims.

In the preceding embodiments/variants, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate/logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/ apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

The invention claimed is:

1. A method of encoding a sequence of images in a bitstream, comprising:
   providing a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set (APS) NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if a prefix APS NAL unit is present in a picture unit, said prefix APS NAL unit shall precede a first VCL NAL unit of the picture unit concerned, and if a suffix APS NAL unit is present in a picture unit, said suffix APS NAL unit shall follow a last VCL NAL unit of the picture unit concerned, each said APS NAL unit having an APS type and an APS identifier,
   wherein all APS NAL units with a prefix NAL unit type and a particular APS identifier and a particular APS type within a given picture unit have the same contents, and all APS NAL units with a suffix NAL unit type and a particular APS identifier and a particular APS type within a given picture unit have the same contents,
   wherein inclusion, in the same picture unit, of a prefix APS NAL unit and a suffix APS NAL unit having the same APS type and the same APS identifier but different contents is permitted, and
   wherein an APS NAL unit in the bitstream is capable of including parameters for adaptive loop filter (ALF).

2. The method as claimed in claim 1, wherein the first VCL NAL unit of the picture unit is located before other one or more VCL NAL units of the picture unit concerned, and the last VCL NAL unit of the picture unit is located after other one or more VCL NAL units of the picture unit concerned.

3. The method as claimed in claim 2, wherein the APS type is indicated by aps_params_type, and the APS type is ALF_APS, LMCS_APS or SCALING_APS.

4. The method as claimed in claim 1, wherein the APS identifier is indicated by adaptation_parameter_set_id which is an identifier value of an APS.

5. The method as claimed in claim 1, wherein a picture parameter set (PPS) which is a non-VCL NAL unit is included in the bitstream.

6. The method as claimed in claim 5, wherein the picture parameter set contains syntax elements that apply to zero or more entire encoded images and contains a syntax element specifying a size of a picture in luma samples.

7. A method of decoding a sequence of encoded images, comprising:
   receiving a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set (APS) NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit,
   wherein if a prefix APS NAL unit is present in a picture unit, said prefix APS NAL unit shall precede a first VCL NAL unit of the picture unit concerned, and if a suffix APS NAL unit is present in a picture unit, said suffix APS NAL unit shall follow a last VCL NAL unit of the picture unit concerned, each said APS NAL unit having an APS type and an APS identifier,
   wherein all APS NAL units with a prefix NAL unit type and a particular APS identifier and a particular APS type within a given picture unit have the same contents, and all APS NAL units with a suffix NAL unit type and a particular APS identifier and a particular APS type within a given picture unit have the same contents, wherein inclusion, in the same picture unit, of a prefix APS NAL unit and a suffix APS NAL unit having the same APS type and the same APS identifier but different contents is permitted, and wherein an APS NAL unit in the bitstream is capable of including parameters for adaptive loop filter (ALF).

8. The method as claimed in claim 7, wherein the first VCL NAL unit of the picture unit is located before other one or more VCL NAL units of the picture unit concerned, and the last VCL NAL unit of the picture unit is located after other one or more VCL NAL units of the picture unit concerned.

9. The method as claimed in claim 7, wherein the APS type is indicated by aps_params_type, and the APS type is ALF_APS, LMCS_APS or SCALING_APS.

10. The method as claimed in claim 7, wherein the APS identifier is indicated by adaptation_parameter_set_id which is an identifier value of an APS.

11. The method as claimed in claim 7, wherein a picture parameter set (PPS) which is a non-VCL NAL unit is included in the bitstream.

12. The method as claimed in claim 11, wherein the picture parameter set contains syntax elements that apply to zero or more entire encoded images and contains a syntax element specifying a size of a picture in luma samples.

13. The method as claimed in claim 7, wherein a prefix APS NAL unit in a picture unit must be before any suffix APS NAL unit in the picture unit concerned.

14. The method as claimed in claim 7, wherein the adaptive loop filter (ALF) is a filtering process that is applied as part of the decoding process.

15. A device for encoding a sequence of images in a bitstream, comprising:

one or more processors that execute a program comprising instructions that cause, when executed by the one or more processors, the one or more processors to:

provide a series of picture units in the bitstream, each said picture unit corresponding to one encoded image and including one or more network abstraction layer (NAL) units, the NAL units includable in the series of picture units comprising video coding layer (VCL) NAL units which each contain encoded image data and also comprising adaptation parameter set (APS) NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if a prefix APS NAL unit is present in a picture unit, said prefix APS NAL unit shall precede a first VCL NAL unit of the picture unit concerned, and if a suffix APS NAL unit is present in a picture unit, said suffix APS NAL unit shall follow a last VCL NAL unit of the picture unit concerned, each said APS NAL unit having an APS type and an APS identifier, wherein all APS NAL units with a prefix NAL unit type and a particular APS identifier and a particular APS type within a given picture unit have the same contents, and all APS NAL units with a suffix NAL unit type and a particular APS identifier and a particular APS type within a given picture unit have the same contents, wherein inclusion, in the same picture unit, of a prefix APS NAL unit and a suffix APS NAL unit having the same APS type and the same APS identifier but different contents is permitted, and wherein an APS NAL unit in the bitstream is capable of including parameters for adaptive loop filter (ALF).

16. A device for decoding a sequence of encoded images, comprising:

one or more processors that execute a program comprising instructions that cause, when executed by the one or more processors, the one or more processors to:

receive a bitstream having a series of picture units, each said picture unit corresponding to one encoded image and including one or more network abstraction layer (NAL) units, the NAL units includable in the series of picture units comprising video coding layer (VCL) NAL units which each contain encoded image data and also comprising adaptation parameter set (APS) NAL units which each contain an adaptation parameter set (APS) having parameters for performing one or more types of processing operation on the image data contained in one or more VCL NAL units, and the APS NAL units includable in the series of picture units comprising a prefix APS NAL unit and a suffix APS NAL unit, wherein if a prefix APS NAL unit is present in a picture unit, said prefix APS NAL unit shall precede a first VCL NAL unit of the picture unit concerned, and if a suffix APS NAL unit is present in a picture unit, said suffix APS NAL unit shall follow a last VCL NAL unit of the picture unit concerned, each said APS NAL unit having an APS type and an APS identifier, wherein all APS NAL units with a prefix NAL unit type and a particular APS identifier and a particular APS type within a given picture unit have the same contents, and all APS NAL units with a suffix NAL unit type and a particular APS identifier and a particular APS type within a given picture unit have the same contents, wherein inclusion, in the same picture unit, of a prefix APS NAL unit and a suffix APS NAL unit having the same APS type and the same APS identifier but different contents is permitted, and wherein an APS NAL unit in the bitstream is capable of including parameters for adaptive loop filter (ALF).

* * * * *